United States Patent [19]

Okino et al.

[11] Patent Number: 5,581,309
[45] Date of Patent: Dec. 3, 1996

[54] MOTION VECTOR DETECTING CIRCUIT

[75] Inventors: Toshiyuki Okino; Toshiya Iinuma; Akio Kobayashi, all of Osaka, Japan

[73] Assignee: Sanyo Electric Co., Ltd., Osaka, Japan

[21] Appl. No.: 618,291

[22] Filed: Mar. 18, 1996

Related U.S. Application Data

[63] Continuation of Ser. No. 368,055, Jan. 3, 1995, abandoned, which is a continuation of Ser. No. 11,755, Feb. 1, 1993, abandoned.

[30] Foreign Application Priority Data

| Feb. 3, 1992 | [JP] | Japan | 4-017711 |
| Mar. 18, 1992 | [JP] | Japan | 4-062217 |
| Mar. 18, 1992 | [JP] | Japan | 4-062219 |
| Apr. 24, 1992 | [JP] | Japan | 4-106621 |

[51] Int. Cl.$^6$ .............................. H04N 7/32; H04N 7/30
[52] U.S. Cl. .............................. 348/699; 348/416
[58] Field of Search .................... 348/699, 416, 348/412, 413, 407, 402; H04N 7/32, 7/30

[56] References Cited

U.S. PATENT DOCUMENTS

| 4,884,136 | 11/1989 | Ninomiya et al. | 358/105 |
| 5,099,323 | 3/1992 | Morimura et al. | 358/108 |
| 5,128,750 | 7/1992 | Katagiri et al. | 358/136 |
| 5,157,732 | 10/1992 | Ishii et al. | 382/1 |
| 5,172,226 | 12/1992 | Morimura et al. | 358/105 |
| 5,204,741 | 4/1993 | Sakaguchi | 358/105 |

*Primary Examiner*—Tommy P. Chin
*Assistant Examiner*—Vu Le
*Attorney, Agent, or Firm*—Armstrong, Westerman, Hattori, McLeland & Naughton

[57] ABSTRACT

Correlated values at respective sampling points are found by a correlated value operating circuit on the basis of image data corresponding to each of sampling points in each of small areas in the present field and image data corresponding to a typical point in the corresponding small area in the preceding field which is stored in typical point data storing circuit. The correlated values which are found by the correlated value operating circuit are sent to an accumulating circuit and an average value calculating circuit. In the accumulating circuit, the correlated values at the sampling points which are the same in displacement from each of the typical points between the small areas in each of motion vector detecting areas are accumulated. In the average value calculating circuit, the total of the correlated values at all the sampling points in each of the motion vector detecting areas is calculated for each motion vector detecting area, and each of the results of the calculation is divided by the total number of sampling points in one of the small areas, thereby to find the average value of values obtained by accumulating the correlated values for each motion vector detecting area.

18 Claims, 14 Drawing Sheets

FIG.3

| 0 | 1 | 2 | 3 | 4 | 5 | 6 | 7 | 8 | 9 | 10 | 11 |
|---|---|---|---|---|---|---|---|---|---|----|----|
| 12 | | | | | | | | | | | |
| | | | | | | | | | | | |
| | | | | | | | | | | | |
| | | | | | | | | | | | |
| | | | | | | | | | | | |
| | | | | | | | | | | | |
| | | | | | | | | | | | |
| | | | | | | | | | | | 107 |
| 108 | 109 | 110 | 111 | 112 | 113 | 114 | 115 | 116 | 117 | 118 | 119 |
| 120 | 121 | 122 | 123 | 124 | 125 | 126 | 127 | 128 | 129 | 130 | 131 |

MOTION VECTOR DETECTING CIRCUIT

This application is a continuation of application Ser. No. 08/368,055 filed Jan. 3, 1995, now abandoned which is a continuation of Ser. No. 08/011,755 filed Feb. 1, 1993, now abandoned.

BACKGROUND OF THE INVENTION

1. Field of the Invention

The present invention relates to a motion vector detecting circuit used in, for example-, an image stabilizing apparatus for correcting the movement of the hands for video cameras.

2. Description of the Prior Art

In an image stabilizing apparatus for correcting the movement of the hands for video cameras, it is important to detect a motion vector so as to extract the movement of an image from a video signal. Some methods of detecting a motion vector have been conventionally proposed. One of the methods of detecting a motion vector is a typical point matching method described in National Technical Report, Vol. 37, No. 3, Jun. 1991, pp. 48 to 54.

Description is now made of the outline of this typical point matching method. A motion vector detecting block is set in a video area, and the motion vector detecting block is divided into a plurality of subblocks. A plurality of sampling points and one typical point are set in each of the subblocks. First, the difference between the level of a video signal corresponding to each of the sampling points in each of the subblocks in the present frame (or the present field) and the level of a video signal corresponding to the typical point in the corresponding subblock in the preceding frame (or the preceding field), that is, a correlated value at each of the sampling points is found. The correlated values at the sampling points which are the same in displacement from each of the typical points between the subblocks are then accumulated. The displacement of the sampling points at which the minimum value of values obtained by accumulating the correlated values is found, that is, the sampling points at which correlation is the highest is extracted as the movement of a subject, that is, a motion vector.

The typical point matching method will be described more specifically. FIG. 12 shows a video area. Four motion vector detecting blocks 21 to 24 of the same size are set in the video area 1. Each of the detecting blocks 21 to 24 is further divided into 30 subblocks 3 of the same size. As shown in FIG. 13, a plurality of sampling points 4 exist in each of the subblocks 3, and one of the sampling points 4 is set to a typical point 5.

FIG. 14 shows a conventional motion vector detecting circuit using a typical point matching method between fields.

A digital video signal inputted to an input terminal 11 is supplied to a typical point memory circuit 12 including a typical point memory (not shown) and a correlated value operating circuit 13. Digital data (luminance data) corresponding to the luminance level of each of the typical points 5 is stored in the typical point memory in the typical point memory circuit 12. In the correlated value operating circuit 13, the absolute value of the difference between digital data (luminance data) corresponding to the luminance level of each of sampling points 4 in each of the subblocks 3 in the present field and the luminance data corresponding to the typical point 5 in the corresponding subblock 3 in the preceding field which is read out from the typical point memory circuit 12, that is, a correlated value at each of the sampling points 4 is operated.

The correlated values at the respective sampling points 4 which are found in the correlated value operating circuit 13 are sent to an accumulating circuit 14 including a correlated value memory (not shown) and an adding circuit (not shown). In the accumulating circuit 14, the correlated values at the sampling points 4 which are the same in displacement from each of the typical points 5 between the subblocks 3 in the same detecting block 21 to 24 are accumulated. This accumulation is performed for each detecting block 21 to 24. The result of the accumulation in each displacement which is found by the accumulating circuit 14 is referred to as a value obtained by accumulating correlated value.

An output of the accumulating circuit 14 is supplied to a minimum value detecting circuit 15 and an average value calculating circuit 16. In the minimum value detecting circuit 15, the minimum value of values obtained by accumulating the correlated values and the displacement of the sampling points at which the minimum value is obtained are found for each detecting block 21 to 24. In the average value calculating circuit 16, the average value of the values obtained by accumulating the correlated values is found for each detecting block 21 to 24.

The displacement, the minimum value and the average value which are found for each detecting block 21 to 24 by the minimum value detecting circuit 15 and the average value calculating circuit 16 are supplied to a microcomputer 17. The microcomputer 17 first extracts four motion vectors for the respective detecting blocks 21 to 24 on the basis of the displacement for each detecting block 12 to 14. The microcomputer 17 then removes one or more motion vectors for the detecting blocks in which the value of the minimum value divided by the average value is smaller than a predetermined threshold value out of the four motion vectors for the respective detecting blocks 21 to 24 as one or ones low in reliability, and extracts one motion vector as a true motion vector from the remaining motion vectors.

Control of addresses, timing and the like of the typical point memory circuit 12, the accumulating circuit 14, and the average value calculating circuit 15 is carried out by a control circuit 18.

In the above described conventional motion vector detecting circuit, the average value of the values obtained by accumulating the correlated values using the accumulating circuit 14 is found. Therefore, each of storage areas holding values obtained by accumulating correlated values in the correlated value memory used in the accumulating circuit 14 requires the number of bits which is sufficient not to cause an overflow even if the correlated values are accumulated. Consequently, a large-capacity memory must be used as the correlated value memory in the accumulating circuit 14.

Furthermore, in the above described conventional motion vector detecting circuit, the number of sampling points 4 may be decreased so as to reduce the capacity of the correlated value memory in the accumulating circuit 14. If the number of sampling points is simply decreased, however, the detection precision is decreased.

When the scanning system is 2:1 line interlacing and the typical point matching method between fields is employed, a typical point memory having a capacity capable of storing luminance data whose number corresponds to the number of typical points 5 corresponding to two fields has been conventionally used as the typical point memory in the typical point memory circuit 12. For example, if the total number of typical points in each field is taken as 120, 240 data storage areas assigned addresses 0 to 239 are provided in the typical point memory.

When a video signal in a first (odd) field is sent, luminance data corresponding to the 120 typical points 5 in the first field are written to the addresses 0 to 119. When a video signal in a second (even) filed is then sent, luminance data corresponding to the typical points 5 in the first field are read out from the addresses 0 to 119 and at the same time, luminance data corresponding to the 120 typical points 5 in the second field are written to addresses 240 to 439.

In the conventional motion vector detecting circuit using the typical point matching method between frames, a typical point memory having a capacity capable of storing data whose number corresponds to the number of typical points 5 corresponding to two frames is used as the typical point memory in the typical point memory circuit 12. Specifically, data storage areas whose number corresponds to the number of typical points corresponding to two fields or two frames have been conventionally required for the typical point memory.

Meanwhile, when the relative position between each of the subblocks 3 and the typical point 5 is always constant as in the above described conventional motion vector detecting circuit, it is possible to write and read out data to and from the typical point memory in different sampling cycles of a video signal. However, when a motion vector is detected while moving typical points for each field as described in, for example, THE JOURNAL OF THE INSTITUTE OF TELEVISION ENGINEERS OF JAPAN, Vol. 45, No. 10, pp. 1221 to 1229 (1991), one of sampling points 4 on the leftmost side (in a start end in the horizontal scanning direction) and a typical point 5 in each of subblocks 3 can coincide with each other. Consequently, data must be written and read out to and from the typical point memory within the same sampling cycle of a video signal. Therefore, a high-speed memory capable of writing and reading out data within the same sampling cycle of a video signal has been conventionally used as the typical point memory. However, such a high-speed memory has the disadvantages of having a large area and consuming high power.

SUMMARY OF THE INVENTION

An object of the present invention is to provide a motion vector detecting circuit capable of reducing the capacity of a correlated value memory used in an accumulating circuit.

Another object of the present invention is to provide motion vector detecting circuit capable of reducing the capacity of a typical point memory used in a typical point memory circuit.

Still another object of the present invention is to provide a motion vector detecting circuit capable of writing and reading out data to and from a typical point memory without using a high-speed memory as the typical point memory even when one of sampling points in a start end in the horizontal scanning direction and a typical point in each of subblocks coincide with each other.

In a motion vector detecting circuit, wherein each of a plurality of motion vector detecting areas set in a video area is further divided into a plurality of small areas, and a plurality of sampling points and one typical point are set in each of the small areas, for comparing image data corresponding to each of the sampling points in each of the small areas in the present field with image data corresponding to the typical point in the corresponding small area in the preceding field and detecting as a motion vector a position where correlation is the highest, a first motion vector detecting circuit according to the present invention is characterized by comprising typical point data storing means for storing the image data corresponding to the typical point in each of the small areas, a correlated value operating circuit for finding correlated values at the respective sampling points on the basis of the image data corresponding to each of the sampling points in each of the small areas in the present field and the image data corresponding to the typical point in the corresponding small area in the preceding field which is stored in the typical point data storing means, an accumulating circuit for accumulating the correlated values at the sampling points which are the same in displacement from each of the typical points between the small areas in each of the motion vector detecting areas out of the correlated values which are found by the correlated value operating circuit, a minimum value detecting circuit for finding for each motion vector detecting area the minimum value of values obtained by accumulating using the accumulating circuit the correlated values at the sampling points which are the same in displacement from each of the typical points between the small areas in each of the motion vector detecting areas and the displacement of the sampling points at which the minimum value is obtained, an average value calculating circuit having as an input an output of the correlated value operating circuit for finding for each motion vector detecting area the average value of the values obtained by accumulating using the accumulating circuit the correlated values at the sampling points which are the same in displacement from each of the typical points between the small areas in each of the motion vector detecting areas, and a motion vector generating circuit for generating a motion vector on the basis of outputs of the minimum value detecting circuit and the average value calculating circuit.

Used as the above described average value calculating circuit is one for calculating for each motion vector detecting area the total of the correlated values at all the sampling points in each of the motion vector detecting areas and dividing each of the results of the calculation by the total number of sampling points in one of the small areas to find the average value of the values obtained by accumulating the correlated values for each motion vector detecting area.

A maximum value fixing circuit for fixing the output of the above described correlated value operating circuit to a predetermined maximum value when the output of the correlated value operating circuit is not less than a predetermined value to reduce the number of bits composing the output of the correlated value operating circuit may be provided in an output stage of the correlated value operating circuit.

Used as the above described accumulating circuit may be one comprising, in addition to correlated value storing means for storing the values obtained by accumulating the correlated values and an adding circuit for adding the output of the above described correlated value operating circuit and an output of the correlated value storing means, a maximum value fixing circuit provided in an output stage of the adding circuit for fixing an output of the adding circuit to a predetermined maximum value when the output of the adding circuit is not less than a predetermined value to reduce the number of bits composing the output of the adding circuit.

There may be provided a horizontal interlacing circuit for interlacing input image data in the horizontal direction, to send image data obtained by the interlacing using the horizontal interlacing circuit to the above described typical point data storing means and the above described correlated value operating circuit.

There may be provided a horizontal interlacing circuit for interlacing input image data in the horizontal direction and an interpolation circuit for imitatively generating image data corresponding to one frame from image data corresponding to one field which is obtained by the interlacing using the horizontal interlacing circuit, to send an output of the interpolation circuit to the above described typical point data storing means and the above described correlated value operating circuit.

In the first motion vector detecting circuit according to the present invention, which is applied to a motion vector detecting circuit using a typical point matching method between fields, the average value of the values obtained by accumulating the correlated values is found on the basis of the output of the correlated value operating circuit, and an output of the accumulating circuit is used only for the minimum value calculating circuit. Accordingly, the number of bits required to calculate the minimum value is sufficient for each of storage areas holding values obtained by accumulating correlated values in the correlated value storing means used in the accumulating circuit, thereby to make it possible to reduce the capacity of the correlated value storing means.

In a motion vector detecting circuit, wherein each of a plurality of motion vector detecting areas set in a video area is further divided into a plurality of small areas, and a plurality of sampling points and one typical point are set in each of the small areas, for comparing image data corresponding to each of the sampling points in each of the small areas in the present frame with image data corresponding to the typical point in the corresponding small area in the preceding frame and detecting as a motion vector a position where correlation is the highest, a second motion vector detecting circuit according to the present invention is characterized by comprising typical point data storing means for storing the image data corresponding to the typical point in each of the small areas, a correlated value operating circuit for finding correlated values at the respective sampling points on the basis of the image data corresponding to each of the sampling points in each of the small areas in the present frame and the image data corresponding to the typical point in the corresponding small area in the preceding frame which is stored in the typical point data storing means, an accumulating circuit for accumulating the correlated values at the sampling points which are the same in displacement from each of the typical points between the small areas in each of the motion vector detecting areas out of the correlated values which are found by the correlated value operating circuit, a minimum value detecting circuit for finding for each motion vector detecting area the minimum value of values obtained by accumulating using the accumulating circuit the correlated values at the sampling points which are the same in displacement from each of the typical points between the small areas in each of the motion vector detecting areas and the displacement of the sampling points at which the minimum value is obtained, an average value calculating circuit having as an input an output of the correlated value operating circuit for finding for each motion vector detecting area the average value of the values obtained by accumulating using the accumulating circuit the correlated values at the sampling points which are the same in displacement from each of the typical points between the small areas in each of the motion vector detecting areas, and a motion vector generating circuit for generating a motion vector on the basis of outputs of the minimum value detecting circuit and the average value calculating circuit.

Used as the above described average value calculating circuit is one for calculating for each motion vector detecting area the total of the correlated values at all the sampling points in each of the motion vector detecting areas and dividing each of the results of the calculation by the total number of sampling points in one of the small areas to find the average value of the values obtained by accumulating the correlated values for each motion vector detecting area.

A maximum value fixing circuit for fixing the output of the above described correlated value operating circuit to a predetermined maximum value when the output of the correlated value operating circuit is not less than a predetermined value to reduce the number of bits composing the output of the correlated value operating circuit may be provided in an output stage of the correlated value operating circuit.

Used as the above described accumulating circuit may be one comprising, in addition to correlated value storing means for storing the values obtained by accumulating the correlated values and an adding circuit for adding the output of the above described correlated value operating circuit and an output of the correlated value storing means, a maximum value fixing circuit provided in an output stage of the adding circuit for fixing an output of the adding circuit to a predetermined maximum value when the output of the adding circuit is not less than a predetermined value to reduce the number of bits composing the output of the adding circuit.

There may be provided a horizontal interlacing circuit for interlacing input image data in the horizontal direction, to send image data obtained by the interlacing using the horizontal interlacing circuit to the above described typical point data storing means and the above described correlated value operating circuit.

In the above described second motion vector detecting circuit according to the present invention, which is applied to a motion vector detecting circuit using a typical point matching method between frames, the average value of the values obtained by accumulating the correlated values is found on the basis of the output of the correlated value operating circuit, and an output of the accumulating circuit is used for only the minimum value calculating circuit. Accordingly, the number of bits required to calculate the minimum value is sufficient for each of storage areas holding values obtained by accumulating correlated values in the correlated value storing means used in the accumulating circuit, thereby to make it possible to reduce the capacity of the correlated value storing means.

In a motion vector detecting circuit, wherein a motion vector detecting area set in a video area is divided into a plurality of small areas, and a plurality of sampling points and one typical point are set in each of the small areas, for comparing image data corresponding to each of the sampling points in each of the small areas in the present field with image data corresponding to the typical point in the corresponding small area in the preceding field and detecting as a motion vector a position where correlation is the highest, a third motion vector detecting circuit according to the present invention is characterized by comprising a horizontal interlacing circuit for interlacing input image data in the horizontal direction, typical point data storing means for storing the image data corresponding to the typical point in each of the small areas on the basis of an output of the horizontal interlacing circuit, a correlated value operating circuit for finding correlated values at the respective sampling points on the basis of the image data corresponding to each of the sampling points in each of the small areas in the present field which is outputted from the horizontal interlacing circuit and the image data corresponding to the typical point in the corresponding small area in the preceding field which is stored in the typical point data storing means, an accumulating circuit for accumulating the correlated values at the sampling points which are the same in displacement from each of the typical points between the small areas in each of the motion vector detecting areas out of the correlated values which are found by the correlated value operating circuit, and a motion vector generating circuit for generating a motion vector on the basis of values obtained by accumulating using the accumulating circuit the correlated values at the sampling points which are the same in displacement from each of the typical points between the small areas in each of the motion vector detecting areas.

In the above described third motion vector detecting circuit according to the present invention, which is applied to a motion vector detecting circuit using a typical point matching method between fields, the input image data is interlaced in the horizontal direction by the horizontal interlacing circuit, and the data obtained by the interlacing is supplied to the correlated value operating circuit, thereby to make it possible to reduce the capacity of the correlated value storing means for storing the values obtained by accumulating the correlated values.

In a motion vector detecting circuit, wherein a motion vector detecting area set in a video area is divided into a plurality of small areas, and a plurality of sampling points and one typical point are set in each of the small areas, for comparing image data corresponding to each of the sampling points in each of the small areas in the present field with image data corresponding to the typical point in the corresponding small area in the preceding field and detecting as a motion vector a position where correlation is the highest, a fourth motion vector detecting circuit according to the present invention is characterized by comprising a horizontal interlacing circuit for interlacing input image data in the horizontal direction, an interpolation circuit for imitatively generating image data corresponding to one frame from image data corresponding to one field which is obtained by the interlacing using the horizontal interlacing circuit, typical point data storing means for storing the image data corresponding to the typical point in each of the small areas on the basis of an output of the interpolation circuit, a correlated value operating circuit for finding correlated values at the respective sampling points on the basis of the image data corresponding to each of the sampling points in each of the small areas in the present field which is outputted from the interpolation circuit and the image data corresponding to the typical point in the corresponding small area in the preceding field which is stored in the typical point data storing means, an accumulating circuit for accumulating the correlated values at the sampling points which are the same in displacement from each of the typical points between the small areas in each of the motion vector detecting areas out of the correlated values which are found by the correlated value operating circuit, and a motion vector generating circuit for generating a motion vector on the basis of values obtained by accumulating using the accumulating circuit the correlated values at the sampling points which are the same in displacement from each of the typical points between the small areas in each of the motion vector detecting areas.

In the above described fourth motion vector detecting circuit according to the present invention, which is applied to a motion vector detecting circuit using a typical point matching method between fields, the input image data is interlaced in the horizontal direction by the horizontal interlacing circuit, the image data corresponding to one frame is imitatively generated from the image data corresponding to one field which is obtained by the interlacing, and the output data of the interpolation circuit is supplied to the correlated value operating circuit, thereby to make it possible to improve the detection precision without increasing the capacity of the correlated value storing means for storing the values obtained by accumulating the correlated values.

In a motion vector detecting circuit, wherein a motion vector detecting area set in a video area is divided into a plurality of small areas, and a plurality of sampling points and one typical point are set in each of the small areas, for comparing image data corresponding to each of the sampling points in each of the small areas in the present frame with image data corresponding to the typical point in the corresponding small area in the preceding frame and detecting as a motion vector a position where correlation is the highest, a fifth motion vector detecting circuit according to the present invention is characterized by comprising a horizontal interlacing circuit for interlacing input image data in the horizontal direction, typical point data storing means for storing the image data corresponding to the typical point in each of the small areas on the basis of an output of the horizontal interlacing circuit, a correlated value operating circuit for finding correlated values at the respective sampling points on the basis of the image data corresponding to each of the sampling points in each of the small areas in the present frame which is outputted from the horizontal interlacing circuit and the image data corresponding to the typical point in the corresponding small area in the preceding frame which is stored in the typical point data storing means, an accumulating circuit for accumulating the correlated values at the sampling points which are the same in displacement from each of the typical points between the small areas in each of the motion vector detecting areas out of the correlated values which are found by the correlated value operating circuit, and a motion vector generating circuit for generating a motion vector on the basis of values obtained by accumulating using the accumulating circuit the correlated values at the sampling points which are the same in displacement from each of the typical points between the small areas in each of the motion vector detecting areas.

In the fifth motion vector detecting circuit according to the present invention, which is applied to a motion vector detecting circuit using a typical point matching method between frames, the input image data is interlaced in the horizontal direction by the horizontal interlacing circuit, and the data obtained by the interlacing is supplied to the correlated value operating circuit, thereby to make it possible to reduce the capacity of the correlated value storing means for storing the values obtained by accumulating the correlated values.

In a motion vector detecting circuit, wherein a motion vector detecting area set in a video area is divided into a plurality of small areas, and a plurality of sampling points and one typical point are set in each of the small areas, for comparing image data corresponding to each of the sampling points in each of the small areas in the present field with image data corresponding to the typical point in the corresponding small area in the preceding field and detecting as a motion vector a position where correlation is the highest, a sixth motion vector detecting circuit according to the present invention is characterized by comprising typical point data storing means for storing the image data corresponding to the typical point in each of the small areas, a control circuit for controlling writing and reading of the image data to and from the typical point data storing means, a correlated value operating circuit for finding correlated values at the respective sampling points on the basis of the image data corresponding to each of the sampling points in each of the small areas in the present field and the image data corresponding to the typical point in the corresponding small area in the preceding field which is stored in the typical point data storing means, an accumulating circuit for accumulating the correlated values at the sampling points which are the same in displacement from each of the typical points between the small areas in each of the motion vector detecting areas out of the correlated values which are found by the correlated value operating circuit, and a motion vector generating circuit for generating a motion vector on the basis of values obtained by accumulating using the accumulating circuit the correlated values at the sampling points which are the same in displacement from each of the typical points between the small areas in each of the motion vector detecting areas, the above described typical point data storing means having image data storage areas whose number is larger than the number of typical points corresponding to one field and is smaller than the number of typical points corresponding to two fields, the above described control circuit so controlling writing and reading of the image data to and from the typical point data storing means that the image data in the present field is written to an address from which the image data in the preceding field is read out by varying for each field read and write addresses assigned to the typical point data storing means.

In the above described sixth motion vector detecting circuit according to the present invention, which is applied to a motion vector detecting circuit using a typical point matching method between fields, the number of image data storage areas in the typical point data storing means can be made smaller than the number of typical points corresponding to two fields, thereby to make it possible to reduce the capacity of the typical point data storing means.

In a motion vector detecting circuit, wherein a motion vector detecting area set in a video area is divided into a plurality of small areas, and a plurality of sampling points and one typical point are set in each of the small areas, for comparing image data corresponding to each of the sampling points in each of the small areas in the present frame with image data corresponding to the typical point in the corresponding small area in the preceding frame and detecting as a motion vector a position where correlation is the highest, a seventh motion vector detecting circuit according to the present invention is characterized by comprising typical point data storing means for storing the image data corresponding to the typical point in each of the small areas, a control circuit for controlling writing and reading of the image data to and from the typical point data storing means, a correlated value operating circuit for finding correlated values at the respective sampling points on the basis of the image data corresponding to each of the sampling points in each of the small areas in the present frame and the image data corresponding to the typical point in the corresponding small area in the preceding frame which is stored in the typical point data storing means, an accumulating circuit for accumulating the correlated values at the sampling points which are the same in displacement from each of the typical points between the small areas in each of the motion vector detecting areas out of the correlated values which are found by the correlated value operating circuit, and a motion vector generating circuit for generating a motion vector on the basis of values obtained by accumulating using the accumulating circuit the correlated values at the sampling points which are the same in displacement from each of the typical points between the small areas in each of the motion vector detecting areas, the above described typical point data storing means having image data storage areas whose number is larger than the number of typical points corresponding to one frame and is smaller than the number of typical points corresponding to two frames, the above described control circuit so controlling writing and reading of the image data to and from the typical point data storing means that the image data in the present frame is written to an address from which the image data in the preceding frame is read out by varying for each frame read and write addresses assigned to the typical point data storing means.

In the above described seventh motion vector detecting circuit according to the present invention, which is applied to a motion vector detecting circuit using a typical point matching method between frames, the number of image data storage areas in the typical point data storing means can be made smaller than the number of typical points corresponding to two frames, thereby to make it possible to reduce the capacity of the typical point data storing means.

In a motion vector detecting circuit, wherein a motion vector detecting area set in a video area is divided into a plurality of small areas, and a plurality of sampling points and one typical point are set in each of the small areas, for comparing image data corresponding to each of the sampling points in each of the small areas in the present field with image data corresponding to the typical point in the corresponding small area in the preceding field and detecting as a motion vector a position where correlation is the highest, an eighth motion vector detecting circuit according to the present invention is characterized by comprising typical point data storing means for storing the image data corresponding to the typical point in each of the small areas, a latch circuit provided in the preceding stage of the typical point data storing means and for temporarily holding the image data corresponding to the typical point, a control circuit for controlling writing and reading of the image data to and from the typical point data storing means, a correlated value operating circuit for finding correlated values at the respective sampling points on the basis of the image data corresponding to each of the sampling points in each of the small areas in the present field and the image data corresponding to the typical point in the corresponding small area in the preceding field which is stored in the typical point data storing means, an accumulating circuit for accumulating the correlated values at the sampling points which are the same in displacement from each of the typical points between the small areas in each of the motion vector detecting areas out of the correlated values which are found by the correlated value operating circuit, and a motion vector generating circuit for generating a motion vector on the basis of values obtained by accumulating using the accumulating circuit the correlated values at the sampling points which are the same in displacement from each of the typical points between the small areas in each of the motion vector detecting areas, the above described control circuit comprising means for generating a read control pulse for each timing at which the image data corresponding to each of the sampling points in a start end in the horizontal scanning direction in each of the small areas is sent to the above described latch circuit, means for generating two write control pulses for each timing at which the image data corresponding to the typical point in each of the small areas is sent to the latch circuit, and means for inhibiting one of the two write control pulses from being supplied to the typical point data storing means when the timing of generating the write control pulse and the timing of generating the read control pulse coincide with each other.

In the above described eighth motion vector detecting circuit according to the present invention, which is applied to a motion vector detecting circuit using a typical point matching method between fields, when the timing of generating one of the two write control pulses which are generated for each timing at which the image data corresponding to the typical point is sent to the latch circuit and the timing of generating the read control pulse coincide with each other, the one write control pulse is inhibited from being supplied to the typical point data storing means. Data is written by the other write control pulse which differs in the timing of generation from the read control pulse out of the two write control pulses, and is read out by the read control pulse.

Consequently, in a case where a motion vector is detected while moving the typical points for each field or in the reverse case where a motion vector is detected while moving for each field the start end in the horizontal scanning direction of the small areas, even if one of the sampling points in the start end in the horizontal scanning direction and the typical point in each of the small areas coincide with each other, it is possible to read out data corresponding to the typical point in the preceding field and write data corresponding to the typical point in the present field without interfering with the operation of correlated values without using a high-speed memory as the typical point data storing means.

In a motion vector detecting circuit, wherein a motion vector detecting area set in a video area is divided into a plurality of small areas, and a plurality of sampling points and one typical point are set in each of the small areas, for comparing image data corresponding to each of the sampling points in each of the small areas in the present frame with image data corresponding to the typical point in the corresponding small area in the preceding frame and detecting as a motion vector a position where correlation is the highest, a ninth motion vector detecting circuit according to the present invention is characterized by comprising typical point data storing means for storing the image data corresponding to the typical point in each of the small areas, a latch circuit provided in the preceding stage of the typical point data storing means and for temporarily holding the image data corresponding to the typical point, a control circuit for controlling writing and reading of the image data to and from the typical point data storing means, a correlated value operating circuit for finding correlated values at the respective sampling points on the basis of the image data corresponding to each of the sampling points in each of the small areas in the present frame and the image data corresponding to the typical point in the corresponding small area in the preceding frame which is stored in the typical point data storing means, an accumulating circuit for accumulating the correlated values at the sampling points which are the same in displacement from each of the typical points between the small areas in each of the motion vector detecting areas out of the correlated values which are found by the correlated value operating circuit, and a motion vector generating circuit for generating a motion vector on the basis of values obtained by accumulating using the accumulating circuit the correlated values at the sampling points which are the same in displacement from each of the typical points between the small areas in each of the motion vector detecting areas, the above described control circuit comprising means for generating a read control pulse for each timing at which the image data corresponding to each of the sampling points in a start end in the horizontal scanning direction in each of the small areas is sent to the above described latch circuit, means for generating two write control pulses for each timing at which the image data corresponding to the typical point in each of the small areas is sent to the latch circuit, and means for inhibiting one of the two write control pulses from being supplied to the above described typical point data storing means when the timing of generating the write control pulse and the timing of generating the read control pulse coincide with each other.

In the above described ninth motion vector detecting circuit according to the present invention, which is applied to a motion vector detecting circuit using a typical point matching method between frames, when the timing of generating one of the two write control pulses generated for each timing at which the image data corresponding to the typical point is sent to the latch circuit and the timing of generating the read control pulse coincide with each other, the one write control pulse is inhibited from being supplied to the typical point data storing means. Data is written by the other write control pulse which differs in the timing of generation from the read control pulse out of the two write control pulses, and is read out by the read control pulse.

Consequently, in a case, for example, a case where a motion vector is detected while moving the typical points for each frame or in the reverse case where a motion vector is detected while moving for each frame the start end in the horizontal scanning direction in the small areas, even if one of the sampling points in the start end in the horizontal scanning direction and the typical point in each of the small areas coincide with each other, it is possible to read out data corresponding to the typical point in the preceding frame and write data corresponding to the typical point in the present frame without interfering with the operation of correlated values without using a high-speed memory as the typical point data storing means.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 3 is a schematic diagram showing storage areas in a typical point memory provided in a typical point memory circuit shown in FIG. 1;

DESCRIPTION OF THE PREFERRED EMBODIMENTS

Referring now to FIGS. 1 to 13, description is made of an embodiment in a case where the present invention is applied to a motion vector detecting circuit using a typical point matching method between fields.

Figure 12:
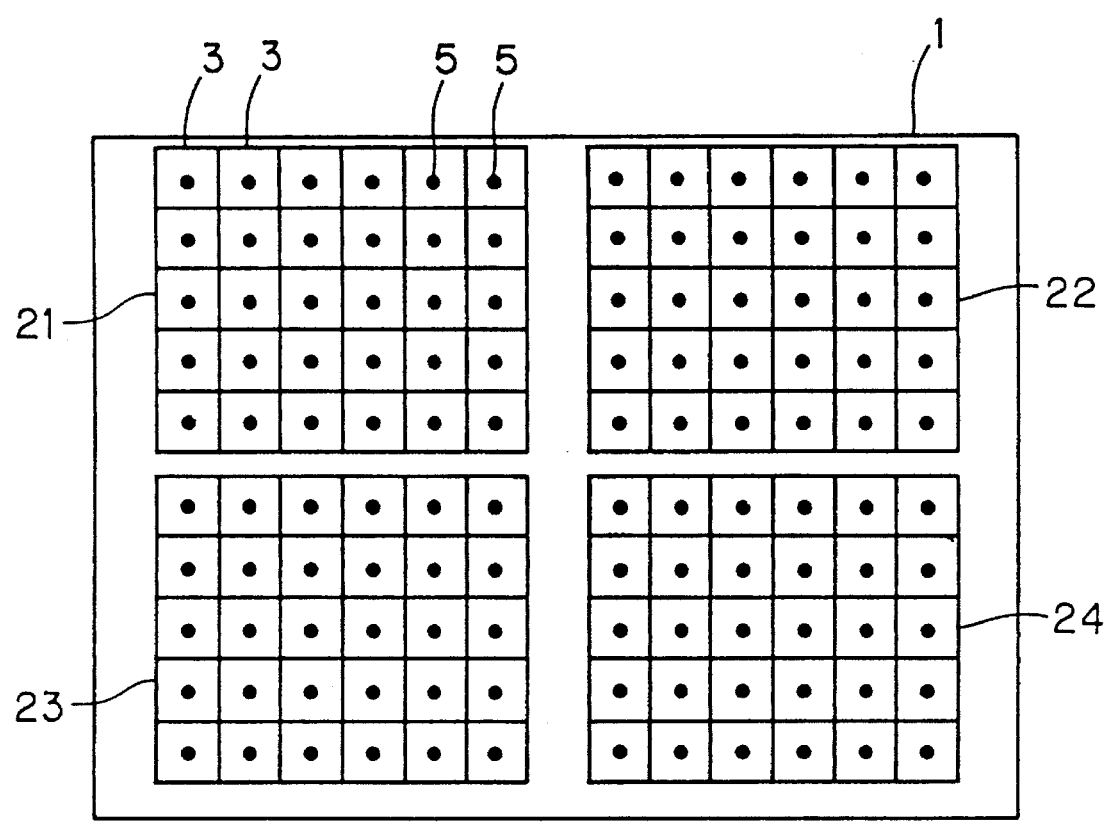
FIG. 12 is a schematic diagram showing motion vector detecting blocks set in a video area and subblocks provided in each of the detecting blocks.
Figure 13:
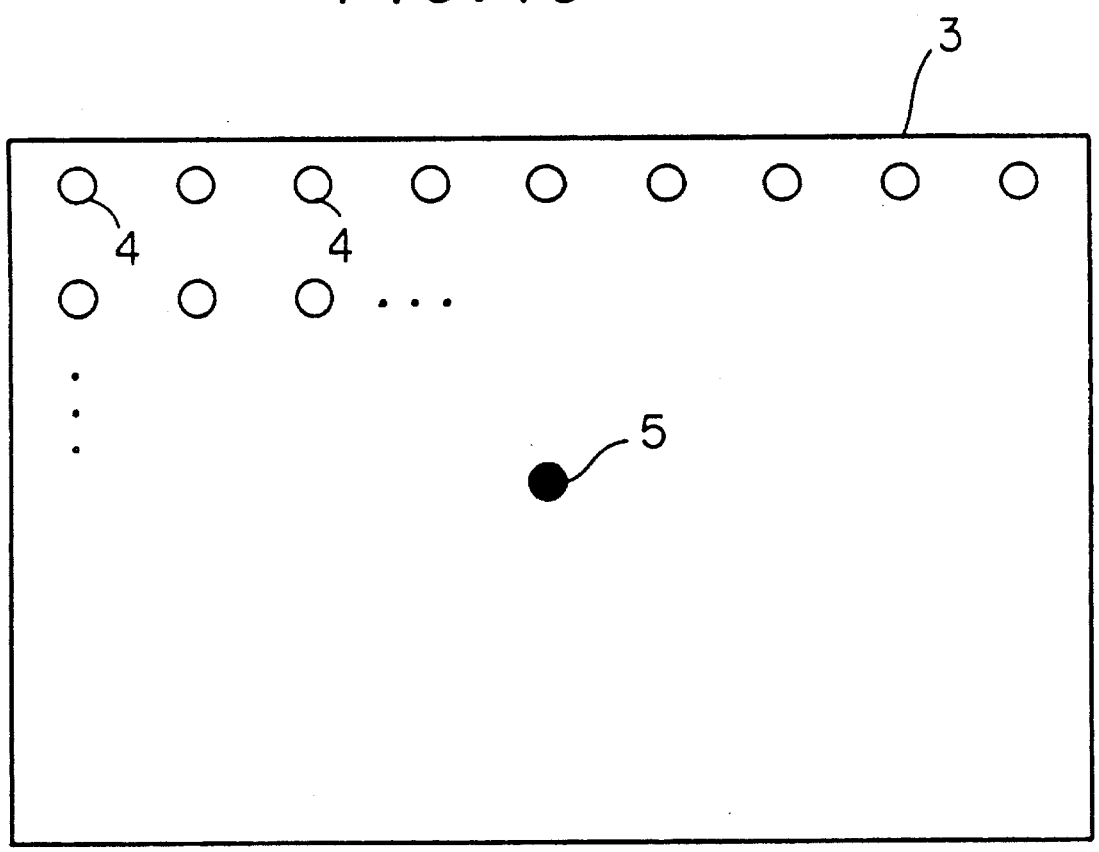
FIG. 13 is a schematic diagram showing sampling points and a typical point set in a subblock.
Figure 14:
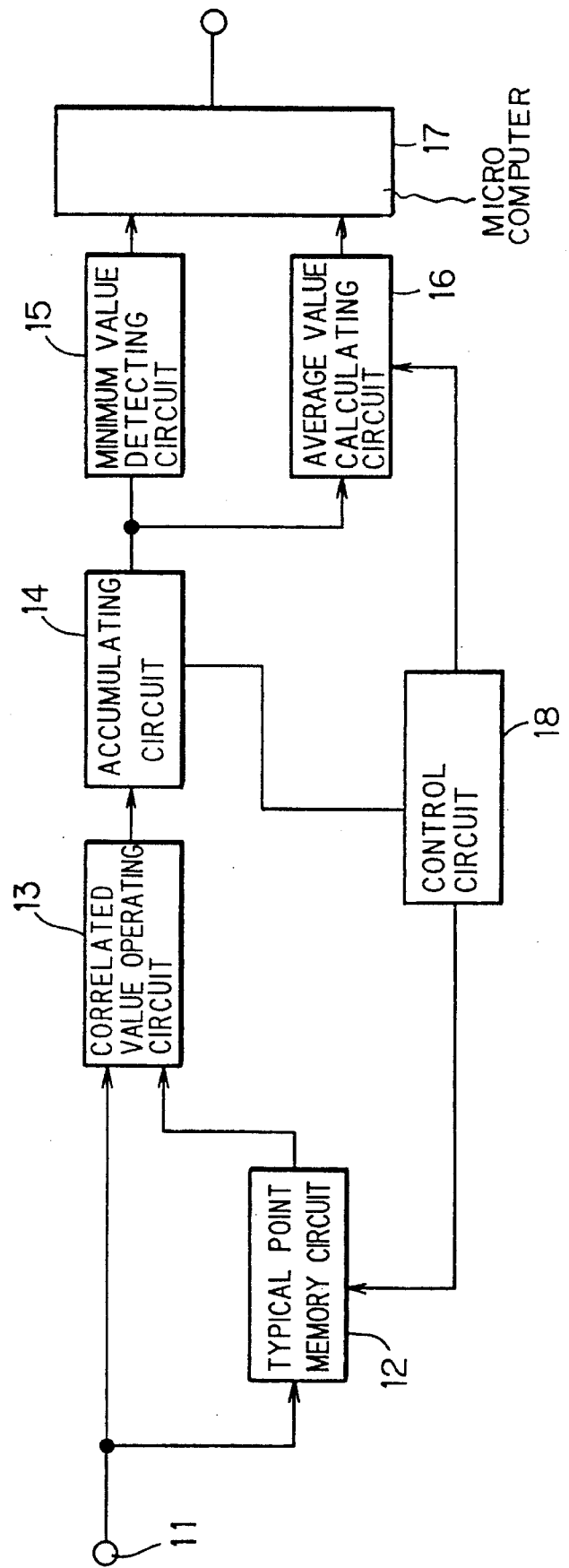
FIG. 14 is an electrical block diagram showing a conventional motion vector detecting circuit.

FIG. 12 shows a video area 1. In the video area 1, four motion vector detecting blocks 21 to 24 of the same size are set. Each of the detecting blocks 21 to 24 is further divided into 30 subblocks 3 of the same size. As shown in FIG. 13, a plurality of sampling points 4 exist in each of the subblocks 3, and one of the sampling points 4 is set to a typical point 5.

Figure 1:
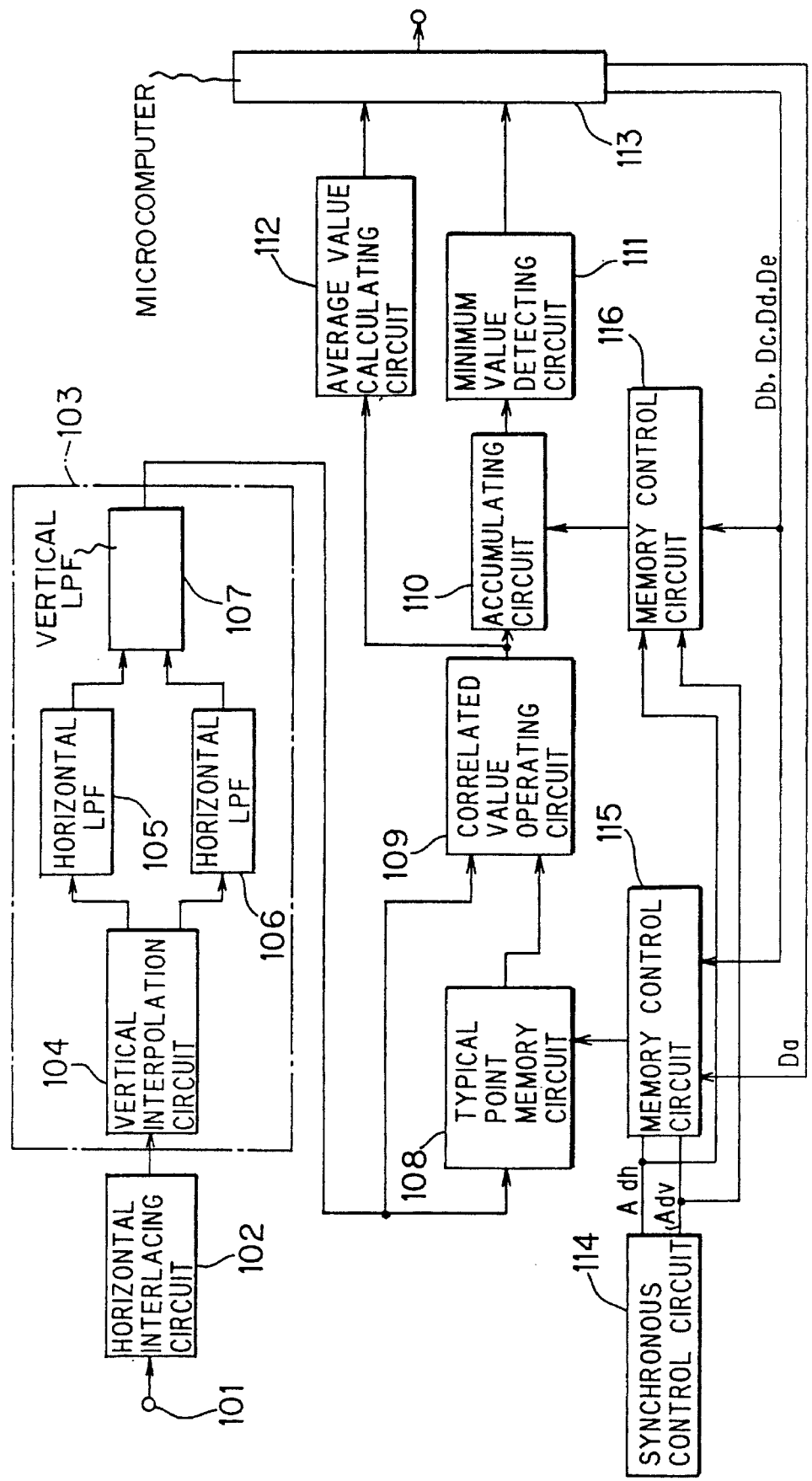
FIG. 1 is an electrical block diagram showing a motion vector detecting circuit according to an embodiment of the present invention.

FIG. 1 shows a motion vector detecting circuit. In the present embodiment, a 14 MHz digital video signal composing eight bits per one pixel which is obtained by a 2:1 line interlacing system is inputted to an input terminal 101. The video signal inputted to the input terminal 101 is sent to a horizontal interlacing circuit 102 which is constituted by a latch circuit operated by a 7 MHz clock. In the horizontal interlacing circuit 102, the video signal is interlaced at a rate of one pixel per two pixels, to be converted into a 7 MHz signal. Since input video data is interlaced in the horizontal direction by the horizontal interlacing circuit 102, it is possible to reduce the capacity of a correlated value memory 504 (see FIG. 9) in an accumulating circuit 110 as described later. Even if the input video data is thus interlaced in the horizontal direction, the results of detection of a motion vector are not adversely affected because the resolution of the human eyes in the horizontal direction is generally less than that in the vertical direction.

An output of the horizontal interlacing circuit 102 is sent to an interpolation circuit 103 for imitatively generating a video signal corresponding to one frame from a video signal corresponding to one field by doubling the number of scanning lines in the field. The interpolation circuit 103 comprises a vertical interpolation circuit 104, a pair of horizontal low-pass filters 105 and 106, and one vertical low-pass filter 107.

Figure 2:
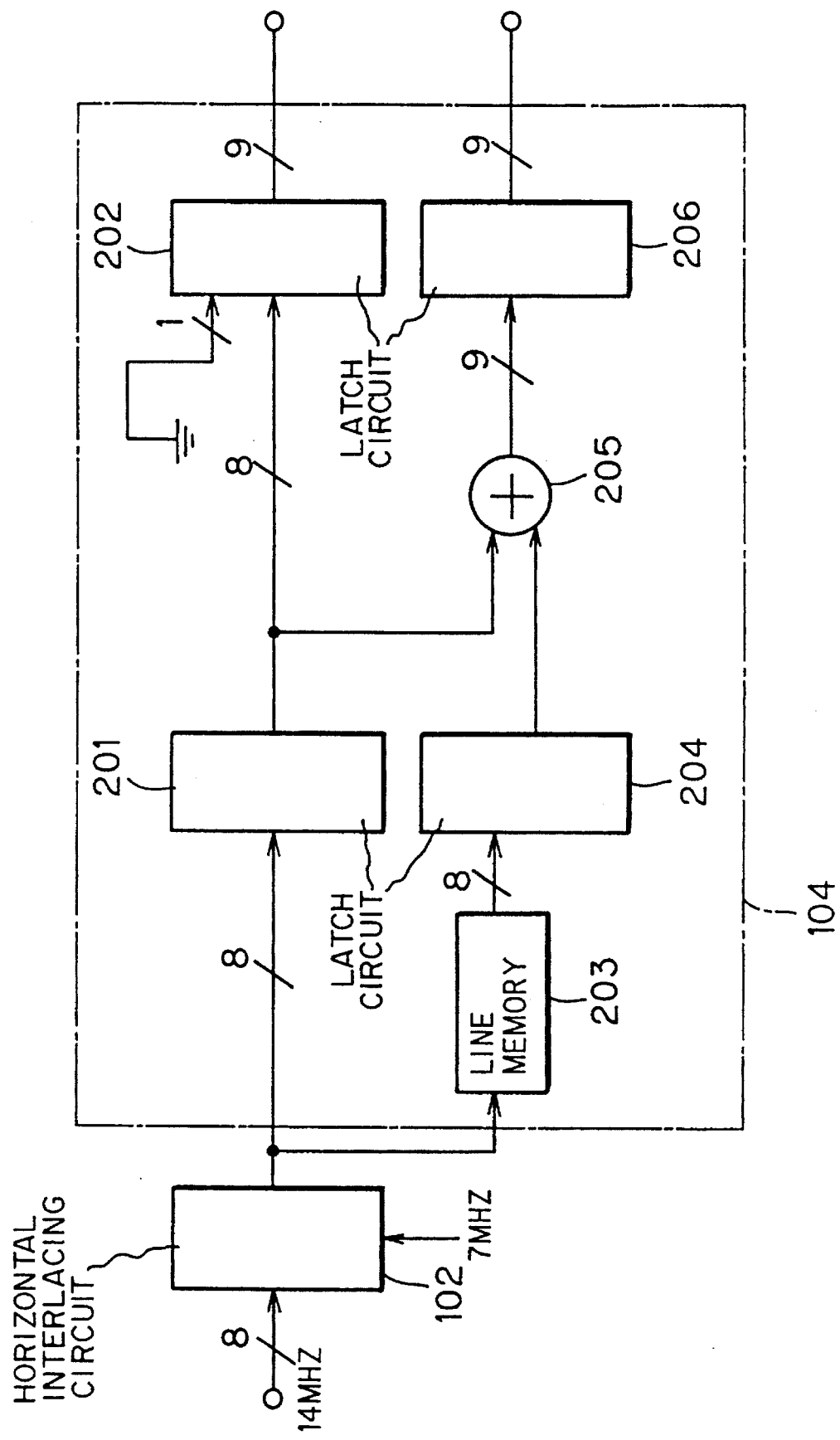
FIG. 2 is an electrical circuit diagram showing the construction of a vertical interpolation circuit shown in FIG. 1.

FIG. 2 shows the details of the vertical interpolation circuit 104 in the interpolation circuit 103.

The output of the horizontal interlacing circuit 102 is sent as original video data through a latch circuit 201 and a latch circuit 202. In addition, the output of the horizontal interlacing circuit 102 is also sent to a line memory 203 storing a video signal in one horizontal scanning period. For each timing at which video data from the horizontal interlacing circuit 102 is latched to the latch circuit 201, video data one horizontal scanning period before from the line memory 203 is latched to a latch circuit 204. The video data one horizontal scanning period before which is latched to the latch circuit 204 and the original video data which is latched to the latch circuit 201 are added to each other by an adding circuit 205, thereby to generate 9-bit interpolation data. This interpolation data is outputted through a latch circuit 206. Since the interpolation data is composed of nine bits, one bit having a value "0" is added to the original video data outputted from the latch circuit 202 on the side of the least significant bit thereof in the latch circuit 202 so that the original video data is also composed of nine bits.

Noises of the original video data and the interpolation data which are outputted from the vertical interpolation circuit 104 are respectively removed by the horizontal low-pass filters 105 and 106. Thereafter, the original video data and the interpolation data are sent to the vertical low-pass filter 107. The data are converted into 14 MHz serial data composing 11 bits per one pixel by the vertical low-pass filter 107. Consequently, a video signal corresponding to one frame generated from a video signal corresponding to one field by doubling the number of scanning lines in the field is obtained.

An output of the interpolation circuit 103 is sent to a typical point memory circuit 108 and a correlated value operating circuit 109. This typical point memory circuit 108 includes a typical point memory 302 (see FIG. 5), and luminance data corresponding to each of the typical points 5 in each field is stored in the typical point memory 302. Furthermore, for each timing at which a video signal corresponding to each of the sampling points 4 in the leftmost column in each of the subblocks 3 is sent to the typical point memory circuit 108, the luminance data corresponding to the typical point 5 in the corresponding subblock 3 in the preceding field is read out from the typical point memory 302. Writing and reading data to and from the typical point memory 302 are controlled by an address signal and a write/read control pulse from a memory control circuit 115. The memory control circuit 115 generates the address signal and the write/read control pulse on the basis of signals sent from a synchronous control circuit 114 and a microcomputer 113.

Examples of inputs to the memory control circuit 115 are a horizontal address signal Adh and a vertical address signal Adv from the synchronous control circuit 114 as well as typical point position data Da, subblock spacing data Db, detecting block spacing data Pc, typical point number data Dd and detection starting position data De from the microcomputer 113. The typical point position data Da is data representing the position of each of the typical points 5. The subblock spacing data Db is data representing the length in the horizontal direction and the length in the vertical direction of each of the subblocks 3. The detecting block spacing data Dc is data representing the spacing in the horizontal direction between the detecting blocks 21 and 22 (or 23 and 24) adjacent to each other in the horizontal direction and the spacing in the vertical direction between the detecting blocks 21 and 23 (or 22 and 24) adjacent to each other in the vertical direction. The detection starting position data De is coordinate data in the upper left end of the detecting block 21.

In the correlated value operating circuit 109, the absolute value of the difference between the luminance data corresponding to each of the sampling points 4 in each of the subblocks 3 in the present field and the luminance data corresponding to the typical point 5 in the corresponding subblock 3 in the preceding field which is read out from the typical point memory 302, that is, a correlated value at each of the sampling points 4 is operated.

Figure 9:
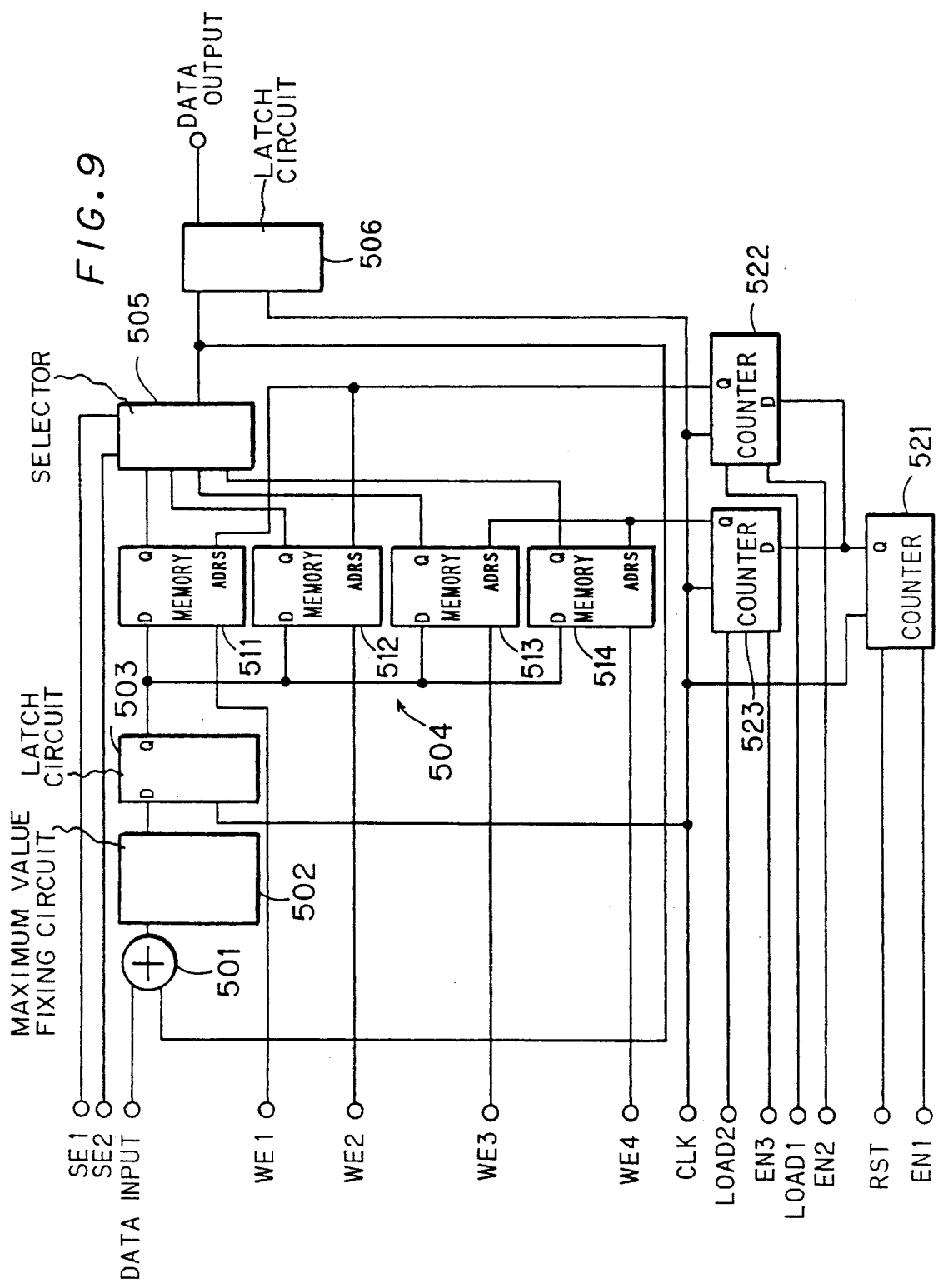
FIG. 9 is an electrical circuit diagram showing the construction of an accumulating circuit shown in FIG. 1.

The correlated values at the respective sampling points 4 which are found in the correlated value operating circuit 109 are sent to an accumulating circuit 110 including an adding circuit 501 (see FIG. 9) and a correlated value memory 504 (see FIG. 9). In the accumulating circuit 110, the correlated values at the sampling points 4 which are the same in displacement from each of the typical points 5 between the subblocks 3 in the same detecting block 21 to 24 are accumulated. This accumulation is performed for each detecting block 21 to 24. Each of the results of the accumulation in each displacement which is found by the accumulating circuit 110 is referred to as a value obtained by accumulating correlated values.

Writing and reading to and from the correlated value memory 504 in the accumulating circuit 110 are controlled by an address signal and a write/read control pulse from a memory control circuit 116. The memory control circuit 116 generates the address signal and the write/read control pulse on the basis of input signals sent from the synchronous control circuit 114 and the microcomputer 113. Examples of inputs to the memory control circuit 116 are a horizontal address signal Adh and a vertical address signal Adv from the synchronous control circuit 114 as well as subblock spacing data Db, detecting block spacing data Dc, typical point number data Dd and detection starting position data De from the microcomputer 113.

The correlated values which are found in the correlated value operating circuit 109 are also sent to an average value calculating circuit 112. In the average value calculating circuit 112, the total of the correlated values at all the sampling points in each of the detecting blocks 21 to 24 is calculated for each detecting block 21 to 24, and each of the results of the calculation is divided by the total number of sampling points in one of the subblocks 3, thereby to find the average value of values obtained by accumulating correlated values for each detecting block 21 to 24.

The values obtained by accumulating correlated values for each detecting block 21 to 24 using the accumulating circuit 110 are supplied to a minimum value detecting circuit 111. In the minimum value detecting circuit 111, the minimum value of the values obtained by accumulating the correlated values and the displacement of the sampling points 4 at which the minimum value is obtained are found for each detecting block 21 to 24. The displacement, the minimum value and the average value which are found for each detecting block 21 to 24 by the minimum value detecting circuit 111 and the average value calculating circuit 112 are supplied to the microcomputer 113. The microcomputer 113 first extracts four motion vectors for the respective detecting blocks 21 to 24 on the basis of the displacement for each detecting block 21 to 24. The microcomputer 113 then removes one or more motion vectors for the detecting blocks in which the value of the minimum value divided by the average value is smaller than a predetermined threshold value out of the four motion vectors for the respective detecting blocks 21 to 24 as one or ones low in reliability, and extracts one motion vector as a true motion vector from the remaining motion vectors.

Description is now made of the specific construction and the operations of the typical point memory circuit 108, the correlated value operating circuit 109, and the accumulating circuit 110.

Figure 4:
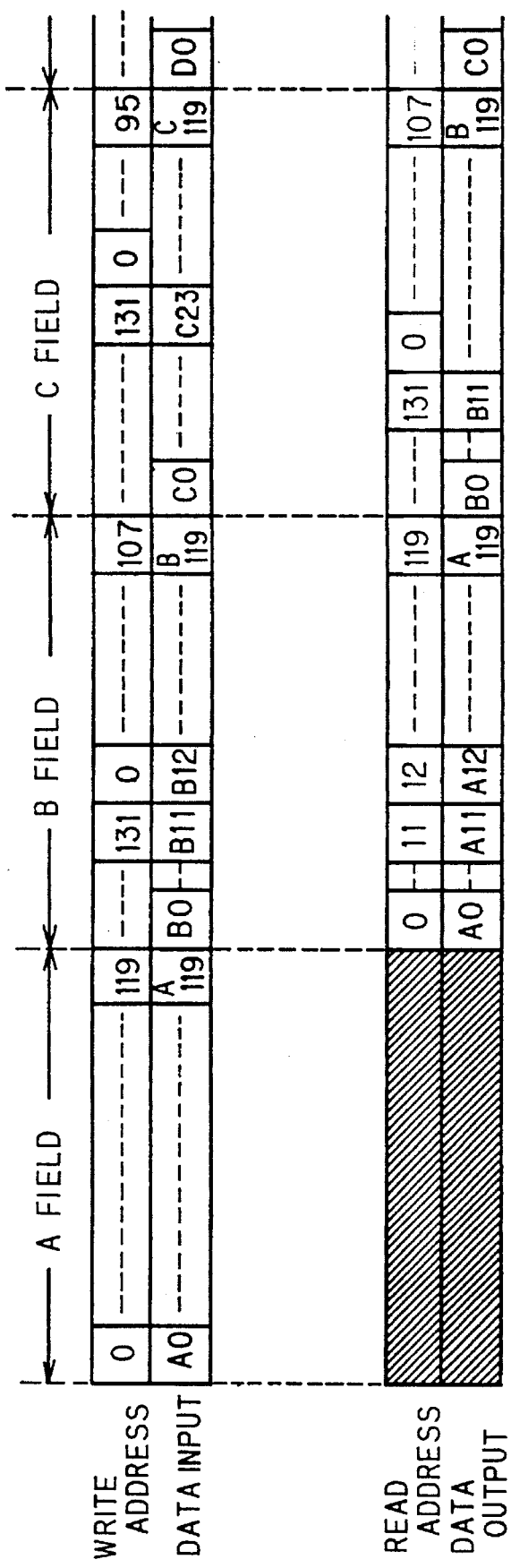
FIG. 4 is a diagram for explaining a method of controlling writing and reading to and from the typical point memory.

FIG. 3 shows storage areas in the typical point memory 302 (see FIG. 5) in the typical point memory circuit 108. In FIG. 3, numerals 0 to 131 respectively represent addresses assigned to the respective storage areas in the typical point memory 302. The typical point memory 302 has storage areas assigned the addresses 0 to 119 whose number corresponds to 120 typical points which exist in one field and storage areas assigned the addresses 120 to 131 whose number corresponds to 12 typical points which exist on one line. The typical point memory 302 is not controlled by a fixed address system in which addresses corresponding to typical points 5 are always constant but controlled by a floating address system in which addresses corresponding to typical points 5 vary for each field as shown in FIG. 4. In FIG. 4, an A field and a C field indicate first (odd) fields, and a B field indicates a second (even) field.

When a video signal in the A field is first sent to the typical point memory circuit 108, luminance data A0 to A119 corresponding to the respective typical points 5 in the A field are written to the addresses 0 to 119 in the typical point memory 302. A video signal in the B field is then sent to the typical point memory circuit 108.

When a video signal corresponding to the subblocks 3 in the uppermost stage out of the subblocks 3 in the B field is sent to the typical point memory circuit 108, for each timing at which a video signal corresponding to each of the sampling points 4 in the leftmost column in each of the subblocks 3 is sent to the typical point memory circuit 108, the luminance data A0 to A11 corresponding to the typical points 5 in the corresponding subblocks 3 in the A field are read out from the storage areas assigned the addresses 0 to 11.

Furthermore, every time luminance data B0 to B11 corresponding to the typical points 5 in the respective subblocks 3 in the uppermost stage in the B field are sent to the typical point memory circuit 108, the luminance data B0 to B11 corresponding to the respective typical points 5 are written to the storage areas assigned the addresses 120 to 131 in the typical point memory 302.

When a video signal corresponding to the subblocks 3 in the stage subsequent to the uppermost stage out of the subblocks 3 in the B field is sent to the typical point memory circuit 108, for each timing at which a video signal corresponding to each of the sampling points 4 in the leftmost column in each of the subblocks 3 is sent to the typical point memory circuit 108, the luminance data A12 to A23 corresponding to the typical points 5 in the corresponding subblocks 3 in the A field are read out from the storage areas assigned the addresses 12 to 23.

When the video signal corresponding to the subblocks 3 in the stage subsequent to the uppermost stage in the B field is sent, the operation of correlated values at the respective sampling points 4 in each of the subblocks 3 in the uppermost stage in the B field has been terminated, and the luminance data A0 to A11 stored in the storage areas assigned the addresses 0 to 11 have not been required. Every time luminance data B12 to B23 corresponding to the typical points 5 in the respective subblocks 3 in the stage subsequent to the uppermost stage in the B field are sent to the typical point memory circuit 108, therefore, the luminance data B12 to B23 corresponding to the respective typical points 5 are written to the storage areas assigned the addresses 0 to 11 in the typical point memory 302. The same operation will be repeated.

Figure 5:
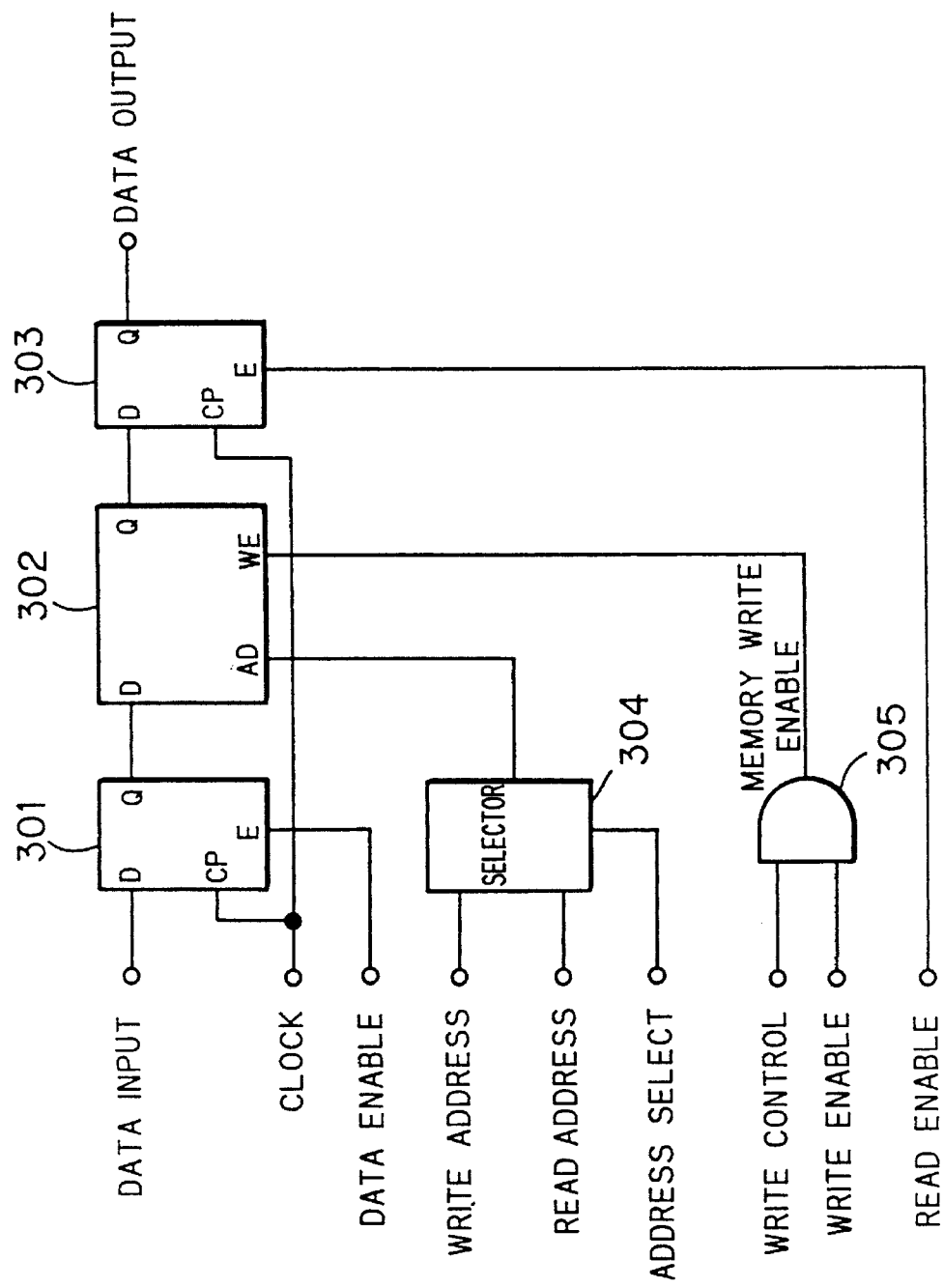
FIG. 5 is an electrical circuit diagram showing the construction of the typical point memory circuit shown in FIG. 1.

FIG. 5 shows the construction of the typical point memory circuit 108.

A latch circuit 301 which is constituted by a D-type flip-flop with an enable terminal is connected to the preceding stage of a typical point memory 302. A video signal outputted from the interpolation circuit 103 is inputted to a data input terminal D of the latch circuit 301. A clock pulse is inputted to a clock pulse input terminal CP of the latch circuit 301. A data enable signal from the memory control circuit 115 is inputted to an enable terminal E of the latch circuit 301. The latch circuit 301 reads the video signal inputted to the data input terminal D and latches the same when the data enable signal is at an H level. A signal outputted from a data output terminal Q of the latch circuit 301 is sent to a data input terminal D of the typical point memory 302.

The typical point memory 302 has an address input terminal AD and a write enable input terminal WE in addition to the data input terminal D and a data output terminal 0. An output of a selector 304 is inputted to the address input terminal AD. An output of an AND circuit 305 is inputted to the write enable terminal WE.

The selector 304 selects either one of a write address signal and a read address signal from the memory control circuit 115 and outputs the same on the basis of an address select signal. The read address signal is selected when the address select signal is at an H level, while the write address signal is selected when the address select signal is at an L level.

The AND circuit 305 carries out the logical AND between a write control signal and a write enable signal, and outputs a memory write enable signal. The typical point memory 302 writes input data to an address specified by the write address signal inputted to the address input terminal AD when the memory write enable signal inputted to the write enable input terminal WE is at an H level. On the other hand, the typical point memory 302 outputs from the data output terminal Q data stored in an address specified by the address signal inputted to the address input terminal AD when the memory write enable signal is at an L level.

A latch circuit 303 which is constituted by a D-type flip-flop with an enable terminal is connected to the succeeding stage of the typical point memory 302. A clock pulse is inputted to a clock pulse input terminal CP of the latch circuit 303. A read enable signal from the memory control circuit 115 is inputted to an enable terminal E of the latch circuit 303. The latch circuit 303 reads an output of the typical point memory 302 and latches the same when the read enable signal is at an H level. A signal outputted from a data output terminal Q of the latch circuit 303 is sent to the correlated value operating circuit 109.

Figure 6:
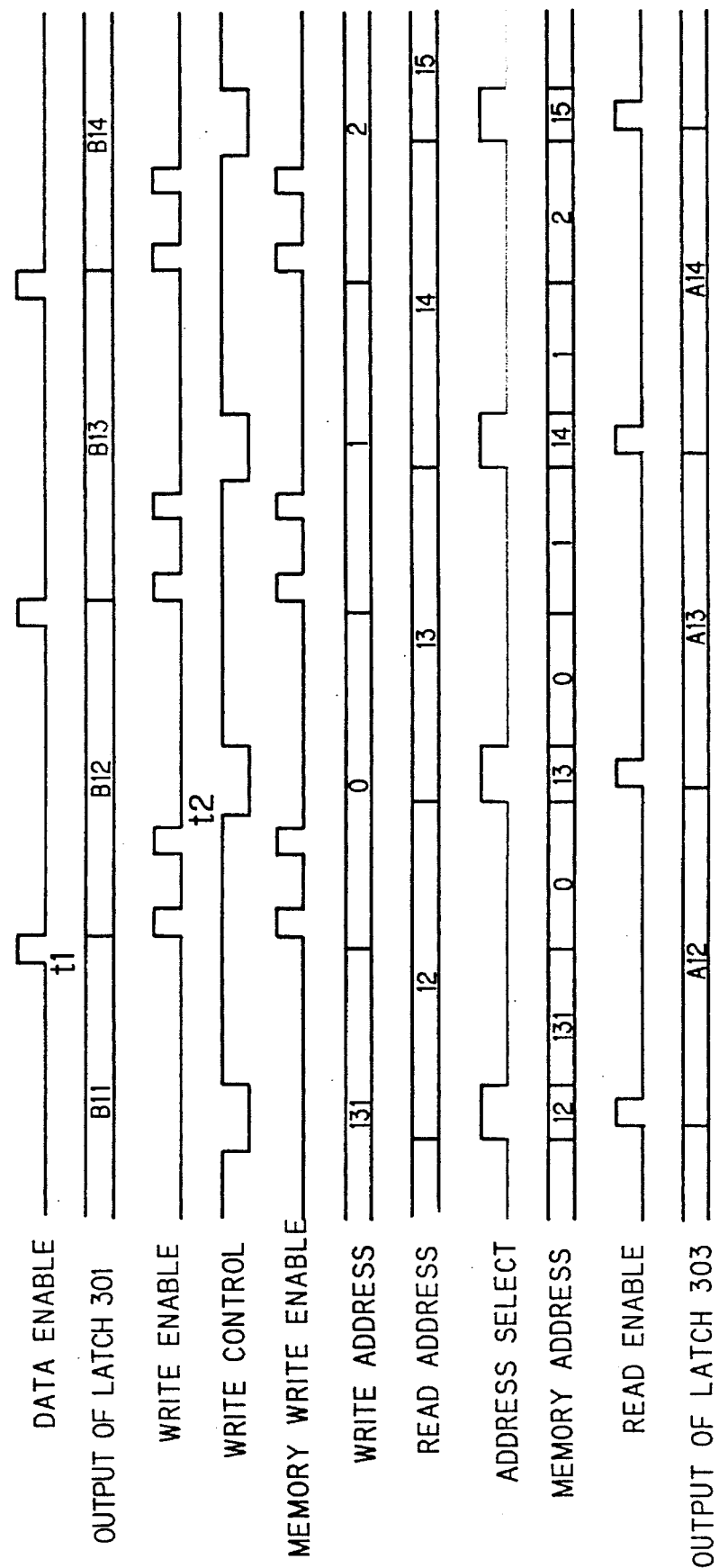
FIG. 6 is a timing chart showing signals in respective portions shown in FIG. 5 in a case where one of sampling points on the leftmost side and a typical point in each of subblocks do not coincide with each other.

FIG. 6 shows signals in respective portions of the typical point memory circuit 108 in a case where video data corresponding to a row in which the typical points 5 in the respective subblocks 3 in the stage subsequent to the uppermost stage in the B field shown in FIG. 4 exist is sent to the typical point memory circuit 108. In this case, the luminance data B12 to B23 corresponding to the typical points 5 in the respective subblocks 3 in the stage subsequent to the uppermost stage in the B field are written to the typical point memory 302 and at the same time, the luminance data A12 to A23 corresponding to the typical points 5 in the respective subblocks 3 in the stage subsequent to the uppermost stage in the A field are read out from the typical point memory 302.

A data enable signal is always at an L level, and is changed to a positive pulse shape for each timing at which video data corresponding to each of the typical points 5 is sent. A write enable signal is always at an L level, and is changed to a double positive pulse shape which is spaced the sampling cycle of a video signal (hereinafter referred to as one clock) apart for each timing at which a video signal corresponding to each of the typical points 5 is sent. A write control signal is always at an H level, and is changed to a negative pulse shape for each timing at which a video signal corresponding to each of the sampling points 4 on the leftmost side in each of the subblocks 3 is sent. An address select signal is always at an L level, and is changed to a positive pulse shape for each timing at which a video signal corresponding to each of the sampling points 4 on the leftmost side in each of the subblocks 3 is sent. A read enable signal is also always at an L level, and is changed to a positive pulse shape for each timing at which a video signal corresponding to each of the sampling points 4 on the leftmost side in each of the subblocks 3 is sent.

At timing at which the luminance data B12 corresponding to the typical point 5 in the subblock 3 on the leftmost side out of the luminance data B12 to B23 corresponding to the typical points 5 in the respective subblocks 3 in the stage subsequent to the uppermost stage in the B field is inputted (at the time point t1), the data enable signal is changed to a positive pulse shape, and the write enable signal is changed to a double positive pulse shape. In this case, the write control signal is at an H level, and the write enable signal is directly inputted to the write enable input terminal WE of the typical point memory 302 as a memory write enable signal. In this case, the address select signal is also at an L level, and a write address signal "0" is inputted to the address input terminal AD of the typical point memory 302 through the selector 304.

While the data enable signal is at an H level at the time point t1, therefore, the luminance data B12 is latched to the latch circuit 301. The luminance data B12 latched is written to the address "0" in the typical point memory 302 which is specified by the write address signal in a period of the first pulse portion in the write enable signal.

Then, at timing at which the luminance data corresponding to each of the sampling points 4 on the leftmost side in the second subblock from the left 3 out of the subblocks 3 in the stage subsequent to the uppermost stage in the B field is inputted (at the time point t2), the write control signal is changed to a negative pulse shape, and the address select signal is changed to a positive pulse shape. In addition, the read enable signal is changed to a positive pulse shape.

When the address select signal is changed to a positive pulse shape, a read address signal "13" is inputted to the address input terminal AD of the typical point memory 302 through the selector 304 while the address select signal is at an H level. Consequently, the luminance data A13 corresponding to the typical point 5 in the second subblock from the left 3 out of the luminance data A12 to A23 corresponding to the typical points 5 in the respective subblocks 3 in the stage subsequent to the uppermost stage in the A field is outputted from the typical point memory 302. The luminance data A13 outputted from the typical point memory 302 is latched to the latch circuit 303 while the read enable signal is at an H level, and is sent as luminance data corresponding to the typical point in the preceding field (in the A field) to the correlated value operating circuit 109. A correlated value of the luminance data corresponding to the typical point with the luminance data corresponding to each of the sampling points 4 in the present field (in the B field) is found by the correlated value operating circuit 109.

Although description was made of a case where one of the sampling points 4 on the leftmost side and the typical point 5 in each of the subblocks 3 do not coincide with each other as shown in FIG. 13, one of the sampling points 4 on the leftmost side and the typical point 5 in each of the subblocks 3 can coincide with each other in a case where a motion vector is detected while moving the typical points for each field or in the reverse case where a motion vector is detected while moving for each field the left end of the subblocks 3, as described in, for example, THE JOURNAL OF THE INSTITUTE OF TELEVISION ENGINEERS OF JAPAN, Vol. 45, No. 10, pp. 1221 to 1229 (1991). Consequently, a period during which the write enable signal is at an H level and a period during which the read enable signal is at an H level coincide with each other, so that the luminance data must be written and read out to and from the typical point memory 302 within a period of one clock. Therefore, a high-speed memory capable of both writing and reading of luminance data within a period of one clock has been conventionally used as the typical point memory. However, such a high-speed memory has the disadvantages of having a large area and consuming high power.

Figure 7:
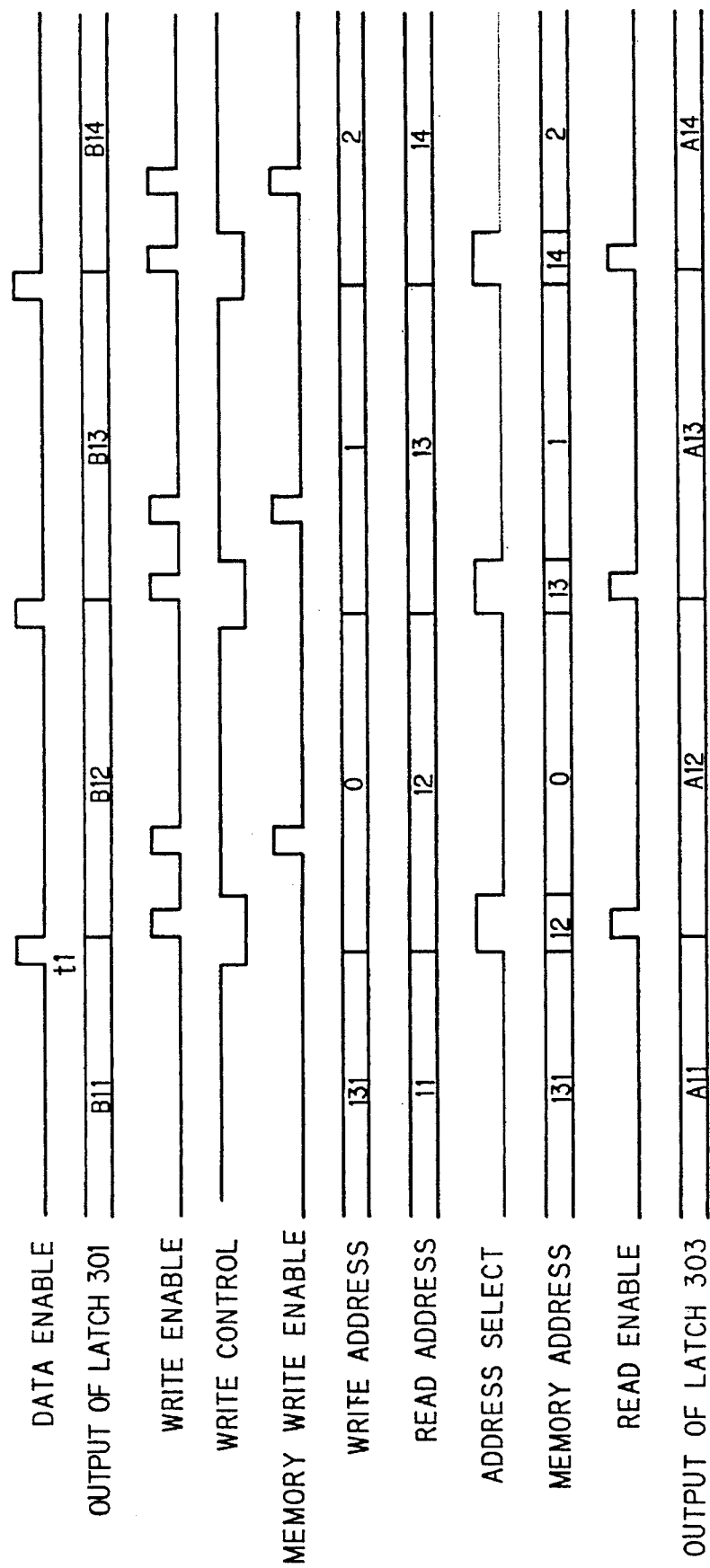
FIG. 7 is a timing chart showing signals in respective portions shown in FIG. 5 in a case where one of sampling points on the leftmost side and a typical point in each of subblocks coincide with each other.

In the motion vector detecting circuit according to the present invention, even when one of the sampling points 4 on the leftmost side and the typical point 5 in each of the subblocks 3 coincide with each other, it is possible to read out the luminance data corresponding to the typical point in the preceding field and write the luminance data corresponding to the typical point in the present field without interfering with the operation of correlated values without using a high-speed memory as the typical point memory 302. Referring now to FIG. 7, description is made of the operation of the typical point memory circuit 108 in a case where one of the sampling points 4 on the leftmost side and the typical point 5 in each of the subblocks 3 coincide with each other.

FIG. 7 shows signals in respective portions of the typical point memory circuit 108 in a case where image data corresponding to a row in which the typical points 5 in the respective subblocks 3 in the stage subsequent to the uppermost stage in the B field exist is sent to the typical point memory circuit 108 when one of the sampling points 4 on the leftmost side and the typical point 5 in each of the subblocks 3 coincide with each other. When one of the sampling points 4 on the leftmost side and the typical point 5 in each of the subblocks 3 coincide with each other, the typical point 5 in each of the subblocks 3 in the stage subsequent to the uppermost stage in the B field is one of the sampling point 4 on the leftmost side in the subblock 3.

Consequently, at timing at which the luminance data B12 corresponding to the typical point 5 in the subblock 3 on the leftmost side out of the subblocks 3 in the stage subsequent to the uppermost stage in the B field, for example, is inputted (at the time point t1), the data enable signal is changed to a positive pulse shape, the write enable signal is changed to a double positive pulse shape, the write control signal is changed to a negative pulse shape, and the address select signal and the read enable signal are changed to a positive pulse shape.

The first pulse portion of the double pulse portion in the write enable signal and the pulse portion in the read enable signal conform in time to each other. In addition, in a predetermined period including a period of the pulse portion in the read enable signal, the write control signal is brought into an L level, and the address select signal is brought into an H level. In addition, before starting a period of the second pulse portion of the double pulse portion in the write enable signal, the write control signal is retuned to an H level, and the address select signal is returned to an L level.

The luminance data B12 is latched to the latch circuit 301 when the data enable signal is at an H level. Then, in a period of the first pulse portion of the double pulse portion in the write enable signal, that is, the pulse portion in the read enable signal, the write control signal is at an L level. Accordingly, the first pulse portion of the double pulse portion in the write enable signal does not appear as an output of the AND circuit 305 and is not sent to the typical point memory 302. In addition, the address select signal is at an H level, so that a read address signal "12" is inputted to the typical point memory 302 through the selector 304.

In a period of the first pulse portion of the double pulse portion in the write enable signal immediately after the time point t1, that is, a period of the pulse portion in the read enable signal, therefore, the first luminance data A12 stored in the address 12 out of the luminance data A12 to A23 corresponding to the typical points 5 in the subblocks 3 in the stage subsequent to the uppermost stage in the A field is outputted from the typical point memory 302. The luminance data A12 outputted from the typical point memory 302 is latched to the latch circuit 303 while the read enable signal is at an H level, and is sent to the correlated value operating circuit 109 as luminance data corresponding to the typical point in the preceding field (A field).

Thereafter, in a period of the second pulse portion of the double pulse portion in the write enable signal, the luminance data B12 latched to the latch circuit 301 is written to the address 0 in the typical point memory 302 which is specified by the write address signal.

More specifically, in the present embodiment, the double pulse-shaped write enable signal is generated to correspond to one of the typical points 5, and the write control signal is brought into an L level so that the write enable signal is not sent to the typical point memory 302 in at least a period during which the read enable signal is at an active level. Consequently, when one of the sampling points 4 on the leftmost side and the typical point 5 in each of the subblocks 3 coincide with each other, the luminance data corresponding to the typical point one field before is read out from the typical point memory 302 in a period of the pulse portion in the read enable signal, and the luminance data corresponding to the typical point in the present field is written to the typical point memory 302 in a period of the second pulse portion of the double pulse portion in the write enable signal.

When one of the sampling points 4 on the leftmost side and the typical point 5 in each of the subblocks 3 thus coincide with each other, the luminance data corresponding to the typical point in the present field is latched to the latch circuit 301, and the timing of writing the luminance data corresponding to the typical point in the present field to the typical point memory 302 is slightly later than the timing of reading the luminance data corresponding to the typical point in the preceding field from the typical point memory 302 so that the data need not be written and read out within a period of one clock. As a result, a high-speed memory need not be used as the typical point memory 302.

Figure 8:
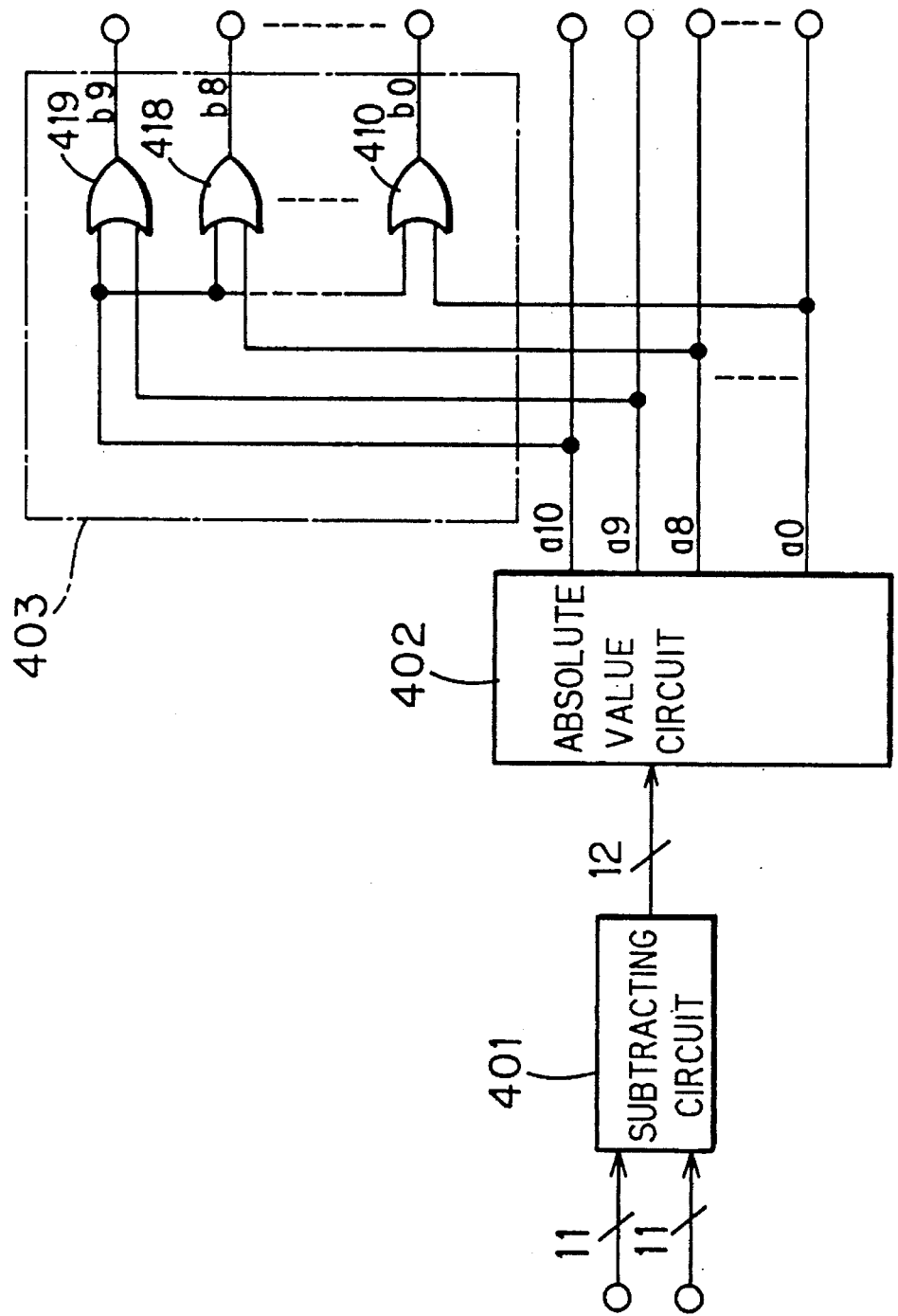
FIG. 8 is an electrical circuit diagram showing the construction of a correlated value operating circuit shown in FIG. 1.

FIG. 8 shows the details of the correlated value operating circuit 109.

The correlated value operating circuit 109 comprises a subtracting circuit 401, an absolute value circuit 402, and a maximum value fixing circuit 403. 11-bit video data in the present field from the interpolation circuit 103 and 11-bit luminance data corresponding to the typical point in the preceding field from the typical point memory circuit 108 are inputted to the subtracting circuit 401. 12-bit (the most significant bit represents the positive or negative) data corresponding to the difference between the 11-bit video data in the present field and the 11-bit luminance data corresponding to the typical point one field before is outputted from the subtracting circuit 401. The data corresponding to the difference which is outputted from the subtracting circuit 401 is sent to the absolute value circuit 402, and the absolute value thereof is outputted as 11-bit correlated value data a10a9a8 . . . a0.

The output a10a9a8 . . . a0 of the absolute value circuit 402 is directly sent to the average value calculating circuit 112 and is also sent to the maximum value fixing circuit 403 in the correlated value operating circuit 109. The maximum value fixing circuit 403 is used for converting the 11-bit data a10a9a8 . . . a0 which is outputted from the absolute value circuit 402 into 10-bit data, and comprises 10 OR circuits 410 to 419. Data a0 to a9 representing bits excluding the most significant bit a10 of the output of the absolute value circuit 402 are inputted to respective one input terminals of the OR circuits 410 to 419. For example, the data a0 representing the least significant bit of the output of the absolute value circuit 402 is inputted to the one input terminal of the OR circuit 410, and the data a9 representing the second bit from the most significant bit of the output of the absolute value circuit 402 is inputted to the one input terminal of the OR circuit 419. In addition, data a10 representing the most significant bit of the output of the absolute value circuit 402 is inputted to the respective other input terminals of the OR circuits 410 to 419.

Consequently, when the data a10 representing the most significant bit of the output of the absolute value circuit 402 is "0", the 10-bit output b9b8 . . . b0 of the maximum value fixing circuit 403 become data a9a8 . . . a0 obtained by deleting the most significant bit of the output a10a9a8 . . . a0 of the absolute value circuit 402. When the data a10 representing the most significant bit of the output of the absolute value circuit 402 is "1", all bits composing the 10-bit output b9b8 . . . b0 of the maximum value fixing circuit 403 are fixed to the maximum value "1". The output b9b8 . . . b0 of the maximum value fixing circuit 403 is sent as correlated value data to the accumulating circuit 110.

By this construction, when the minimum number of bits composing the correlated value data required to detect the minimum value by the minimum value detecting circuit 111 is smaller than the number of bits composing the input data of the correlated value operating circuit 109, it is possible to reduce the number of bits by the difference in the number of bits. Although in the above described embodiment, the difference in the number of bits is one bit, the difference in the number of bits may be not less than two bits. In this case, the logical OR between the logical OR of a plurality of most significant bits to be deleted and each of the remaining bits may be carried out.

FIG. 9 shows the details of the accumulating circuit 110.

In the accumulating circuit 110, the correlated values at the sampling points 4 which are the same in displacement from each of the typical points 5 between the subblocks 3 in the same detecting block 21 to 24 are accumulated.

The accumulating circuit 110 comprises an adding circuit 501, a maximum value fixing circuit 502, a latch circuit 503, a correlated value memory 504 comprising four memories 511 to 514, a selector 505, a latch circuit 506, and three counters 521, 522 and 523.

As the number of storage areas holding values obtained by accumulating correlated values in the correlated value memory, only the number of detecting blocks times the number of sampling points in one subblock 3 has been conventionally required. When the number of detecting blocks is four as shown in FIG. 12, storage areas holding values obtained by accumulating correlated values whose number is four times the number of sampling points in one subblock 3 are required.

In the present embodiment, during several horizontal scanning periods from the time when the accumulation with respect to the two detecting blocks 21 and 22 which exist in the upper half of the video area 1 out of the four detecting blocks 21 to 24 is terminated to the time when the accumulation with respect to the two detecting blocks 23 and 24 in the lower half thereof is started, the minimum value is detected with respect to the detecting blocks 21 and 22 by the minimum value detecting circuit 111. Therefore, the number which is twice the number of sampling points in one subblock 3 is sufficient for the number of storage areas holding values obtained by accumulating correlated values in the correlated value memory 504. Accordingly, the capacity of the correlated value memory 504 is one-half the capacity of the conventional correlated value memory.

The selector 505 sequentially selects outputs of the four memories 511 to 514 and outputs the same on the basis of two select signals SEL1 and SEL2. The three counters 521, 522 and 523 generate address signals of the four memories 511 to 514. The latch circuits 503 and 506 then hold data inputted thereto for a period of one clock.

Figure 10:
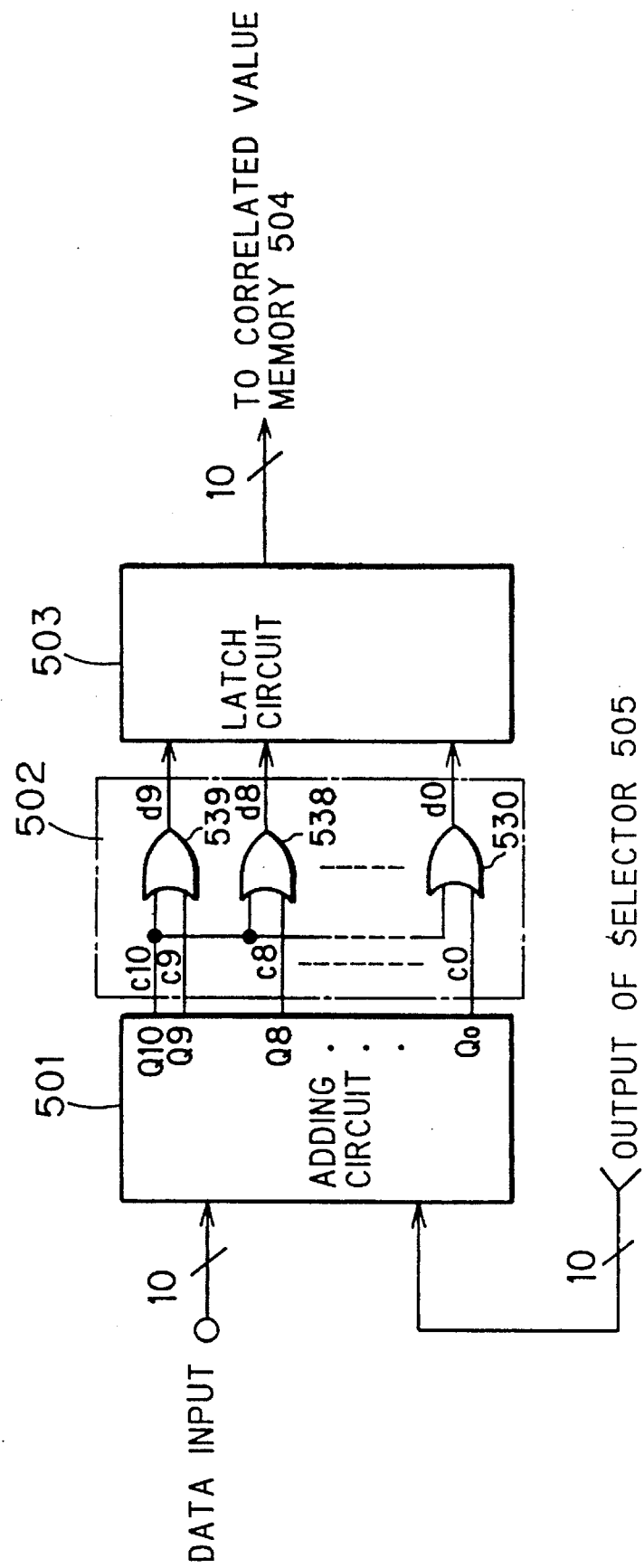
FIG. 10 is an electrical circuit diagram showing the construction of a maximum value fixing circuit shown in FIG. 9.

The adding circuit 501 adds a 10-bit data input (a correlated value) from the correlated value operating circuit 109 and a 10-bit output of the selector 505. The adding circuit 501 comprises 10-bit output terminals Q0 to Q9 and a carry terminal Q10, as shown in FIG. 10, and the output thereof becomes a 11-bit signal c10c9 . . . c0.

The 11-bit signal c10c9 . . . c0 outputted from the adding circuit 501 is converted into a 10-bit signal d9d8 . . . d0 by the maximum value fixing circuit 502. The maximum vale fixing circuit 502 is constituted by 10 OR circuits 530 to 539. Data c0 to c9 representing bits excluding the most significant bit c10 of the output of the adding circuit 501 are inputted to respective one input terminals of the OR circuits 530 to 539. For example, the data c0 representing the least significant bit of the output of the adding circuit 501 is inputted to the one input terminal of the ON circuit 530, and the data c9 representing the second bit from the most significant bit of the output of the adding circuit 501 is inputted to the one input terminal of the OR circuit 539. In addition, data c10 representing the most significant bit of the output of the adding circuit 501 is inputted to the respective other input terminals of the OR circuits 530 to 539.

Consequently, when the data c10 representing the most significant bit of the output of the adding circuit 501 is "0", the 10-bit output d9d8 . . . d0 of the maximum value fixing circuit 502 becomes data c9c8 . . . c0 obtained by deleting the most significant bit c10 of the output c10c9c8 . . . c0 of the adding circuit 501. When the data c10 representing the most significant bit of the output of the adding circuit 501 is "1", all bits composing the 10-bit output d9d8 . . . d0 of the maximum value fixing circuit 502 are fixed to the maximum value "1". The output d9d8 . . . d0 of the maximum value fixing circuit 502 is sent to the latch circuit 503.

Figure 11:
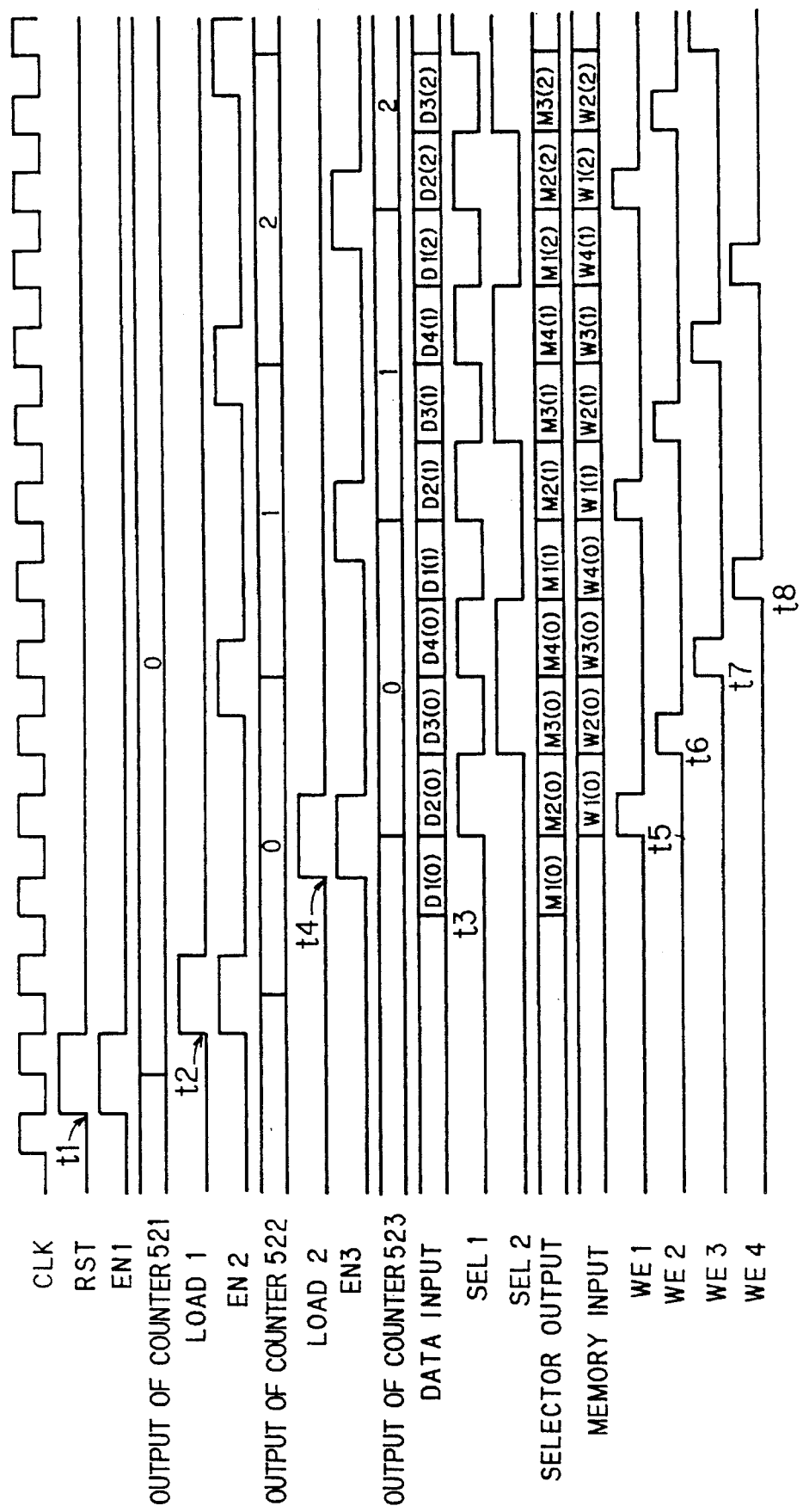
FIG. 11 is a timing chart showing signals in respective portions shown in FIG. 9.

FIG. 11 shows signals in respective portions of the accumulating circuit 110. In FIG. 11, numerals subsequent to alphabets D, M and W in signs indicating the contents of a data input, a selector output and a memory input represent numbers of the four memories 511, 512, 513 and 514. Specifically, a numeral "1", a numeral "2", a numeral "3", and a numeral "4" respectively represent the first memory 511, the second memory 512, the third memory 513, and the fourth memory 514. In addition, numerals in parentheses subsequent to alphabets D, M and W represent addresses in each of the memories 511 to 514.

The first counter 521 is reset by a reset pulse RST which is generated at the time point t1, performs a counting operation on the basis of a first enable signal EN1, and outputs a first count value "0". The output "0" of the first counter 521 is loaded into the second counter 522 by a first load signal LOAD1 which is generated at the time point t2. In addition, the output "0" of the first counter 521 is loaded into the third counter 523 by a second load signal LOAD 2 which is generated at the time point t4 later than the first load signal LOAD1 by two periods of a clock signal CLK. Data from the correlated value operating circuit 109 starts to be inputted from the time point t3 earlier than the time point t4 by a half period of the clock signal CLK. Correlated value data are sequentially inputted for each time corresponding to one period of the clock signal CLK.

The second counter 522 performs a counting operation by a second enable signal EN2 which is generated from the time point t2, and sequentially updates a count value, for example, "0", "1", "2", . . . The second enable signal EN 2 has a period which is four times the period of the clock signal CLK. An output of the second counter 522 is supplied as an address signal to the first memory 511 and the second memory 512.

The third counter 523 performs a counting operation by a third enable signal EN3 which has the same period as that of the second enable signal EN2 and is generated from the time point t4, and updates a count value, for example, "0", "1", "2" . . . An output of the third counter 523 is supplied as an address signal to the third memory 513 and the fourth memory 514.

The selector 505 sequentially selects outputs of the first to fourth memories 511 to 514 and outputs the same for each period of the clock signal CLK from the time point t3 at which the correlated value data from the correlated value operating circuit 109 starts to be inputted on the basis of a combination of two selection signals SEL1 and SEL2. Specifically, when the two selection signals SEL1 and SEL2 are at an L level, an output M1 (j) (j=0, 1 . . . ) of the first memory 511 is selected. When the selection signal SEL1 is at an H level and the selection signal SEL2 is at an L level, an output M2 (j) (j=0, 1 . . . ) of the second memory 512 is selected. When the selection signal SEL1 is at an L level and the selection signal SEL2 is at an H level, an output M3 (j) (j=0, 1 . . . ) of the third memory 513 is selected. When both the two selection signals SEL1 and SEL2 are at an H level, an output M4 (j) (j=0, 1 . . . ) of the fourth memory 514 is selected.

A first write enable signal WE1 to be supplied to the first memory 511 has a period which is four times the period of the clock signal CLK, and is generated from the time point t5 later than the time point t3 by one period of the clock signal CLK. Second, third and fourth write enable signals WE2. WE3 and WE4 to be supplied to the second, third and fourth memories 512, 513 and 514 have periods which are the same as the period of the first write enable signal WE1, and are respectively generated sequentially from the time points t6, t7 and t8 later than the time point t5 by one period of the clock signal CLK. Specifically, the write enable signals WE1 to WE4 to be supplied to the first to fourth memories 511 to 514 enter an active level for each one period of the clock signal CLK from the time point t5.

The data representing a value obtained by accumulating correlated values which is outputted from the selector 505 is held for only one period of the clock signal CLK by the latch circuit 506 and outputted from the latch circuit 506, and is also sent to the adding circuit 501. In the adding circuit 501, the data is added to the correlated value data from the correlated value operating circuit 109. Data representing the results of the addition from the adding circuit 501 is converted into 10-bit data by the maximum value fixing circuit 502 and then, is held for only one period of the clock signal CLK by the latch circuit 503 and outputted from the latch circuit 503.

The data outputted from the latch circuit 503 is sequentially written to the first memory 511, the second memory 512, the third memory 513 and the fourth memory 514 in this order in accordance with the first to fourth write enable signals WE1 to WE4. The addresses in each of the memories 511 to 514 are updated for each four periods of the clock signal CLK by the second and third counters 522 and 523. Accordingly, every time writing of the data to the first to fourth memories 511 to 514 is terminated, the addresses in each of the memories 511 to 514 are updated.

Specifically, the correlated value data from the correlated value operating circuit 109 is sent and at the same time, the data representing a value obtained by accumulating correlated values which has been already stored in the correlated value memory 504 is outputted from the selector 505, so that both the data are added to each other by the adding circuit 501, and the data representing the result of the addition is latched to the latch circuit 503. When the succeeding correlated value data is sent, the succeeding data representing a value obtained by accumulating correlated values is outputted from the selector 505, so that both the data are added to each other and at the same time, the data representing the result of the addition which has been latched to the latch circuit 503 is written to an address in the correlated value memory 504 at which the data representing a value obtained by accumulating correlated values which was outputted from the selector 505 had been stored. Such an operation will be repeatedly executed.

In the present embodiment, the four small-capacity memories 511 to 514 are used as the correlated value memory 504, and writing and reading to and from the same address in the same memory 511 to 514 is achieved in a time divisional manner so that a large-capacity memory need not be used.

Meanwhile, the value obtained by accumulating correlated values which is outputted from the latch circuit 506 while the accumulation is performed by the accumulating circuit 110 is not used for detecting the minimum value by the minimum value detecting circuit 111. Processing for detecting the minimum value by the minimum value detecting circuit 111 is started from the time point at which processing for accumulation with respect to the two detecting blocks 21 and 22 in the upper half of the video area 1 is terminated and the time point at which processing for accumulation with respect to the two detecting blocks 23 and 24 in the lower half of the video area 1 is terminated.

Specifically, when the processing for accumulation with respect to the two detecting blocks 21 and 22 in the upper half of the video area 1 is terminated, data representing values obtained by accumulating correlated values are sent to the minimum value detecting circuit 111 from the correlated value memory 504, so that the minimum value of the values obtained by accumulating correlated values and the displacement of the sampling points at which the minimum value is obtained are found in each of the detecting blocks 21 and 22. Similarly, when the processing for accumulation with respect to the two detecting blocks 23 and 24 in the lower half of the video area 1 is terminated, data representing values obtained by accumulating correlated values are sent to the minimum value detecting circuit 111 from the correlated value memory 504, so that the minimum value of the values obtained by accumulating correlated values and the displacement of the sampling points at which the minimum value is obtained are found in each of the detecting blocks 23 and 24.

Although description was made of the motion vector detecting circuit using a typical point matching method between fields, the present invention is also applicable to a motion vector detecting circuit using a typical point matching method between frames. In addition, the present invention is also applicable to a motion vector detecting circuit used in an image stabilizing apparatus for camera recorders in addition to the motion vector detecting circuit used in an image stabilizing apparatus for correcting the movement of the hands for video cameras.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A motion vector detecting apparatus, comprising:

a plurality of motion vector detecting areas set in an effective image area which each include a predetermined number of smaller regions;

a plurality of respective sampling points and one typical point disposed in each of said small areas, for use in comparing input image data corresponding to each of the sampling points in each of said small areas in a present field with input image dam corresponding to a typical point selected in a corresponding small area in a preceding field;

a motion vector detecting circuit for detecting as a motion vector a position where correlation is the highest, said motion vector detecting circuit comprising:

a horizontal interlacing circuit receiving the input image data and interlacing the input image data in a horizontal direction to produce a horizontally interlaced output;

an interpolation circuit receiving the Output of said horizontal interlacing circuit, said interpolation circuit removing noise from the output of the horizontal interlacing circuit;

typical point data storing means for storing the input image data corresponding to the typical point selected in each of the small areas.., for use in performing matching of points between frames;

a correlated value operating circuit for determining correlated values at said respective sampling points on the basis of said input image data corresponding to each of sampling points in each of the small areas in the present field and said input image data corresponding to the typical point in the corresponding small area in the preceding field which is stored in said typical point data storing means;

an accumulating circuit for accumulating said correlated values determined by said correlated value operating circuit at the sampling points which are the same in displacement from each of the typical points between the small areas in each of the motion vector detecting areas out of said correlated values which are determined by said correlated value operating circuit, for use in performing matching of points between frames;

memory control means for introducing memory control to synchronize reading and writing of data by said typical point data storing means and said accumulating circuit when performing matching of points between frames;

a minimum value detecting circuit for determining for each of said motion vector detecting areas the minimum value of values obtained by accumulating using said accumulating circuit said correlated values at the sampling points which are the same in displacement from each of the typical points between the small areas in each of the motion vector detecting areas and the displacement of the sampling points at which the minimum value is obtained;

an average value calculating circuit having as an input an output of said correlated value operating circuit for determining for each of said motion vector detecting areas the average value of the values obtained by accumulating said correlated values at the sampling points which are the same in displacement from each of the typical points between the small areas in each of said motion vector detecting areas; and a motion vector generating circuit for generating a motion vector on the basis of outputs of said minimum value detecting circuit and said average value calculating circuit.

2. The motion vector detecting circuit according to claim 1, wherein said average value calculating circuit calculates for each of said motion vector detecting areas the total of said correlated values at all the sampling points in each of the motion vector detecting ares and divides each of the results of the calculation by the total number of sampling points in one of the small areas, thereby to find the average value of the values obtained by adding said correlated values of each of said motion vector detecting areas.

3. The motion vector detecting circuit according to claim 1, wherein said correlated value operating circuit further comprises a subtracting circuit, an absolute value circuit receiving an output of said subtracting circuit, and a first maximum value fixing circuit receiving an output of said absolute value circuit for producing an output signal, said first maximum value fixing circuit fixing a value of its produced said output signal to a predetermined maximum output value when the output of said absolute value circuit is not less than a predetermined input value to reduce the number of bits composing the output of said correlated value operating circuit, said first maximum value fixing circuit being in an output stage of said correlated value operating circuit.

4. The motion vector detecting circuit according to claim 1, wherein said accumulating circuit comprises an adding circuit receiving the output of said correlated value operating circuit for accumulating said correlated values, correlated value storing means for storing values obtained by said adding circuit, and selecting means receiving an output from said correlated value storing means for selecting an output from said correlated value storing means, said adding circuit adding the output of said correlated value operating circuit and an output of the correlated value storing means selected by said selecting means, and a second maximum value fixing circuit connected between said adding circuit and said correlated value storing means for fixing an output of said adding circuit to a predetermined maximum value when the output of said adding circuit is not less than a predetermined value to reduce the number of bits composing the output of said adding circuit being provided in an output stage of said adding circuit.

5. The motion vector detecting circuit according to claim 1, wherein said horizontal interlacing circuit interlaces said input image data corresponding to each of the sampling points in each of the small areas in the present field in the horizontal direction, said horizontal interlacing circuit supplying its output to said typical point data storing means and said correlated value operating circuit.

6. The motion vector detecting circuit according to claim 1, further comprising an interpolation circuit and a horizontal interlacing circuit for interlacing said input image data corresponding to each of the sampling points in each of the small areas in the present field in the horizontal direction, said horizontal interlacing circuit producing output image data to said interpolation circuit, said interpolation circuit imitatively generating interlaced image data corresponding to one frame from said output image data produced by interlacing using said horizontal interlacing circuit, an output of said interpolation circuit being sent to said typical point data storing means and said correlated value operating circuit.

7. A motion vector detecting apparatus, comprising:

a plurality of motion vector detecting areas set in an effective image area which each include a predetermined number of smaller regions;

a plurality of respective sampling points and one typical point disposed in each of said small areas, for use in comparing input image data corresponding to each of the sampling points in each of said small areas in a present field with input image data corresponding to a typical point selected in a corresponding small area in a preceding field;

a motion vector detecting circuit for detecting as a motion vector a position where correlation is the highest, said motion vector detecting circuit comprising:

a horizontal interlacing circuit receiving the input image data and interlacing the input image data in a horizontal direction to produce a horizontally interlaced output;

an interpolation circuit receiving the output of said horizontal interlacing circuit, said interpolation circuit removing noise from the output of the horizontal interlacing circuit;

typical point data storing means for storing the input image data corresponding to the typical point selected in each of the small areas, for use in performing matching of points between frames;

a correlated value operating circuit for determining correlated values at said respective sampling points on the basis of said input image data corresponding to each of sampling points in each of the small areas in the present field and said input image data corresponding to each of the sampling points in each of the small areas in the present frame and said input image data corresponding to the typical point in the corresponding small area in the preceding frame which is stored in said typical point data storing means;

an accumulating circuit for accumulating said correlated values determined by said correlated value operating circuit at the sampling points which are the same in displacement from each of the typical points between the small areas in each of the motion vector detecting areas out of said correlated values which are determined by said correlated value operating circuit, for use in performing matching of points between frames;

memory control means for introducing memory control to synchronize reading and writing of data by said typical point data storing means and said accumulating circuit when performing matching of points between frames;

a minimum value detecting circuit for determining for each of said motion vector detecting areas the minimum value of values obtained by accumulating using said accumulating circuit said correlated values at the sampling points which are the same in displacement from each of the typical points between the small areas in each of the motion vector detecting areas and the displacement of the sampling points at which the minimum value is obtained;

an average value calculating circuit having as an input an output of said correlated value operating circuit for determining for each of said motion vector detecting areas the average value of the values obtained by accumulating said correlated values at the sampling points which are the same in displacement from each of the typical points between the small areas in each of said motion vector detecting areas; and a motion vector generating circuit for generating a motion vector on the basis of outputs of said minimum value detecting circuit and said average value calculating circuit.

8. The motion vector detecting circuit according to claim 7, wherein said average value calculating circuit calculates for each of said motion vector detecting areas the total of said correlated values at all the sampling points in each of the motion vector detecting ares and divides each of the results of the calculation by the total number of sampling points in one of the small areas, thereby to find the average value of the values obtained by adding said correlated values of each of said motion vector detecting areas.

9. The motion vector detecting circuit according to claim 7, wherein said correlated value operating circuit further comprises a subtracting circuit, an absolute value circuit receiving an output of said subtracting circuit, and a first maximum value fixing circuit receiving an output of said absolute value circuit for producing an output signal, said first maximum value fixing circuit fixing a value of its produced said output signal to a predetermined maximum output value when the output of said absolute value circuit is not less than a predetermined input value to reduce the number of bits composing the output of said correlated value operating circuit, said first maximum value fixing circuit being in an output stage of said correlated value operating circuit.

10. The motion vector detecting circuit according to claim 7, wherein said accumulating circuit comprises an adding circuit receiving the output of said correlated value operating circuit for accumulating said correlated values, correlated value storing means for storing values obtained by said adding circuit, and selecting means receiving an output from said correlated value storing means for selecting an output from said correlated value storing means, said adding circuit adding the output of said correlated value operating circuit and an output of the correlated value storing means selected by said selecting means, and a second maximum value fixing circuit connected between said adding circuit and said correlated value storing means for fixing an output of said adding circuit to a predetermined maximum value when the output of said adding circuit is not less than a predetermined value to reduce the number of bits composing the output of said adding circuit being provided in an output stage of said adding circuit.

11. The motion vector detecting circuit according to claim 7, wherein said horizontal interlacing circuit interlaces said input image data corresponding to each of the sampling points in each of the small areas in the present field in the horizontal direction, said horizontal interlacing circuit supplying its output to said typical point data storing means and said correlated value operating circuit.

12. A motion vector detecting apparatus, comprising:

a plurality of motion vector detecting areas set in an effective image area which each include a predetermined number of smaller regions;

a plurality of respective sampling points and one typical point disposed in each of said small areas, for use in comparing input image data corresponding to each of the sampling points in each of said small areas in a present field with input image data corresponding to a typical point selected in a corresponding small area in a preceding field;

a motion vector detecting circuit for detecting as a motion vector a position where correlation is the highest, said motion vector detecting circuit comprising:

a horizontal interlacing circuit for interlacing said input image data in the horizontal direction to produce a horizontally interlaced output;

an interpolation circuit receiving the output of said horizontal interlacing circuit, said interpolation circuit removing noise from the output of the horizontal interlacing circuit:

typical point data storing means for storing said input image data corresponding to a typical point selected in each of the small areas on the basis of an output of said horizontal interlacing circuit, for use in performing matching of points between frames;

a correlated value operating circuit for determining correlated values at said respective sampling points on the basis of said input image data corresponding to each of sampling points in each of the small areas in the present field and said input image data corresponding to each of the sampling points in each of the small areas in the present field which is outputted from said horizontal interlacing circuit and said input image data corresponding to the typical point in the corresponding small area in the preceding field which is stored in said typical point data storing means;

an accumulating circuit for accumulating said correlated values determined by said correlated value operating circuit at the sampling points which are the same in displacement from each of the typical points between the small areas in each of said the motion vector detecting areas out of said correlated values which are determined by said correlated value operating circuit, for use in performing matching of points between frames;

memory control means for introducing memory control to synchronize reading and writing of data by said typical point data storing means and said accumulating circuit when performing matching of points between frames;

a minimum value detecting circuit for determining for each of said motion vector detecting areas the minimum values of values obtained by accumulating using said accumulating circuit said correlated values at the sampling points which are the same in displacement from each of the typical points between the small areas in each of the motion vector detecting areas and the displacement of the sampling points at which the minimum value is obtained;

an average value calculating circuit having as an input an output of said correlated value operating circuit for determining for each of said motion vector detecting areas the average value of the values obtained by accumulating said correlated values at the sampling points which are the same in displacement from each of the typical points between the small areas in each of the motion vector detecting areas; and a motion vector generating circuit for generating a motion vector on the basis of outputs of said minimum value detecting circuit and said average value calculating circuit.

13. A motion vector detecting apparatus, comprising:

a motion vector detecting area set in an effective image area which each include a predetermined number of smaller regions;

a plurality of respective sampling points and one typical point disposed in each of said small areas, for use in comparing input image data corresponding to each of the sampling points in each of said small areas in a present field with input image data corresponding to a typical point selected in a corresponding small area in a preceding field;

a motion vector detecting circuit for detecting as a motion vector a position where correlation is the highest, said motion vector detecting circuit comprising:

a horizontal interlacing circuit receiving the input image data and interlacing the input image data in a horizontal direction to produce a horizontally interlaced output;

an interpolation circuit receiving the output of said horizontal interlacing circuit, said interpolation circuit removing noise from the output of the horizontal interlacing circuit;

typical point data storing means for storing said input image data corresponding to a typical point selected in each of the small areas on the basis of an output of said interpolation circuit, for use in performing matching of points between frames;

a correlated value operating circuit for determining correlated values at said respective sampling points on the basis of said input image data corresponding to each of sampling points in each of the small areas in the present field and said input image data corresponding to each of the sampling points in each of the small areas in the present field which is outputted from said interpolation circuit and said input image data corresponding to the typical point in the corresponding small area in the preceding field which is stored in said typical point data storing means;

an accumulating circuit for accumulating said correlated values determined by said correlated value operating circuit at the sampling points which are the same in displacement from each of the typical points between the small areas in each of said the motion vector detecting areas out of said correlated values which are determined by said correlated value operating circuit, for use in performing matching of points between frames;

memory control means for introducing memory control to synchronize reading and writing of data by said typical point data storing means and said accumulating circuit when performing matching of points between frames; and a motion vector generating circuit for generating a motion vector on the basis of values obtained by accumulating using said accumulating circuit said correlated values at the sampling points which are the same displacement from each of the typical points between the small areas in each of said the motion vector detecting areas.

14. A motion vector detecting apparatus, comprising:

a plurality of motion vector detecting areas set in an effective image area which each include a predetermined number of smaller regions;

a plurality of respective sampling points and one typical point disposed in each of said small areas, for use in comparing input image data corresponding to each of the sampling points in each of said small areas in a present field with input image data corresponding to a typical point selected in a corresponding small area in a preceding frame;

a motion vector detecting circuit for detecting as a motion vector a position where correlation is the highest, said motion vector detecting circuit comprising:

a horizontal interlacing circuit receiving the input image data and interlacing the input image data in a horizontal direction to produce a horizontally interlaced output;

an interpolation circuit receiving the output of said horizontal interlacing circuit, said interpolation circuit removing noise from the output of the horizontal interlacing circuit;

a horizontal interlacing circuit for interlacing said input image data in the horizontal direction;

typical point data storing means for storing said input image data corresponding to a typical point selected in each of the small areas on the basis of an output of said horizontal interlacing circuit, for use in performing matching of points between frames;

a correlated value operating circuit for determining correlated value at said respective sampling points on the basis of said input image data corresponding to each of sampling points in each of the small areas in the present field and said input image data corresponding to each of the sampling points in each of the small areas in the present frame which is outputted from said horizontal interlacing circuit and said input image data corresponding to the typical point in the corresponding small area in the preceding from which is stored in said typical point data storing means;

an accumulating circuit for accumulating said correlated values determined by said correlated value operating circuit at the sampling points which are the same in displacement from each of the motion vector detecting areas out of said correlated values which are determined by said correlated value operating circuit for use in performing matching of points between frames;

memory control means for introducing memory control to synchronize reading and writing of data by said typical point data storing means and said accumulating circuit when performing matching of points between frames;

a minimum value detecting circuit for determining for each of said motion vector detecting areas the minimum values of values obtained by accumulating using said accumulating circuit said correlated values at the sampling points which are the same in displacement from each of the typical points between the small areas in each of the motion vector detecting areas and the displacement of the sampling points at which the minimum value is obtained;

an average value calculating circuit having as an input an output of said correlated value operating circuit for determining for each of said motion vector detecting areas the average value of the values obtained by accumulating said correlated values at the sampling points which are the same in displacement from each of the typical points between the small areas in each of the motion vector detecting areas; and a motion vector generating circuit for generating a motion vector on the basis of outputs of said minimum value detecting circuit and said average value calculating circuit.

15. In a motion vector detecting circuit, wherein a motion vector detecting area set in a video area is divided into a plurality of small ares, and a plurality of respective sampling points and one typical point are set in each of the small areas, for comparing input image data corresponding to each of the sampling points in each of the same areas in the present field with input image data corresponding to a typical point selected in the corresponding small area in the preceding field and detecting as a motion vector a position where correlation is the highest, said motion vector detecting circuit comprising:

typical point data storing means for storing said input image data corresponding to a typical point selected in each of said small areas:

a control circuit for controlling writing and reading of said input image data to and from said typical point data storing means;

a correlated value operating circuit for determining correlated values at said respective sampling points on the basis of said input image data corresponding to each of the sampling points in each of the small areas in the present field and said input image data corresponding to the typical point in the corresponding small area in the preceding field which is stored in said typical point data storing means;

an accumulating circuit for accumulating said correlated values determined by said correlated value operating circuit at the sampling points which are the same in displacement from each of the typical points between the small areas in each of the motion vector detecting areas out of said correlated values which are determined by said correlated value operating circuit; and a motion vector generating circuit for generating a motion vector on the basis of values obtained by accumulating using said accumulating circuit said correlated values at the sampling points which are the same in displacement from each of the typical points between the small areas in each of said the motion vector detecting areas, said typical point data storing means having image data storage areas whose number is larger than the number of typical points corresponding to one field and is smaller than the number of typical points corresponding to two fields, said control circuit so controlling writing and reading of said input image data to and from said typical point data storing means that said input image data in the present field is written to an address from which previously stored image data in the preceding field is read out by varying for each field read and write addresses assigned to said typical point data storing means.

16. In a motion vector detecting circuit, wherein a motion vector detecting area set in a video area is divided into a plurality of small areas, and a plurality of respective sampling points and one typical point are set in each of the small areas, for comparing input image data corresponding to each of the sampling points in each of the small areas in the present frame with input image data corresponding to a typical point selected in the corresponding small area in the preceding frame and detecting as a motion vector a position where correlation is the highest, said motion vector detecting circuit comprising:

typical point data storing means for storing said input image data corresponding to a typical point selected in each of the small areas;

a control circuit for controlling writing and reading of said input image data to and from said typical point data storing means;

a correlated value operating circuit for determining correlated values at said respective sampling points on the basis of said input image data corresponding to each of the sampling points in each of the small areas in the present frame and said input image data corresponding to the typical point in the corresponding small area in the preceding frame which is stored in said typical point data storing means;

an accumulating circuit for accumulating said correlated values determined by said correlated value operating circuit at the sampling points which are the same in displacement from each of the typical points between the small areas in each of the motion vector detecting areas out of said correlated values which are determined by said correlated value operating circuit; and a motion vector generating circuit for generating a motion vector on the basis of values obtained by accumulating using said accumulating circuit said correlated values at the sampling points which are the same in displacement from each of the typical points between the small areas in each of said the motion vector detecting areas, said typical point data storing means having image data storage areas, there being more said data storage areas than there are said typical points corresponding to one frame, and there being fewer said data storage areas than there are said typical points corresponding to two frames, said control circuit so controlling writing and reading of said input image data to and from said typical point data storing means that said input image data in the present frame is written to an address from which said input image data in the preceding frame is read out by varying for each frame read and write addresses assigned to said typical point data storing means.

17. In a motion vector detecting circuit, wherein a motion vector detecting area set in a video area is divided into a plurality of small areas, and a plurality of respective sampling points and one typical point are set in each of the small areas, for comparing input image data corresponding to each of the sampling points in each of the small areas in the present field with input image data corresponding to a typical point selected in the corresponding small area in a preceding field and detecting as a motion vector a position where correlation is the highest, said motion vector detecting circuit comprising:

typical point data storing means for storing said input image data corresponding to a typical point selected in each of the small areas;

a latch circuit provided in said typical point data storing means for temporarily holding said input image data corresponding to the typical point;

a control circuit for controlling writing and reading of said input image data to and from said typical point data storing means;

a correlated value operating circuit for determining correlated values at said respective sampling points on the basis of said input image data corresponding to each of the sampling points in each of the small areas in the present field and said input image data corresponding to the typical point in the corresponding small area in the preceding field which is stored in said typical point data storing means;

an accumulating circuit for accumulating said correlated values determined by said correlated value operating circuit at the sampling points which are the same in displacement from each of the typical points between the small areas in each of the motion vector detecting areas out of said correlated values which are determined by said correlated value operating circuit; and a motion vector generating circuit for generating a motion vector on the basis of values obtained by accumulating using said accumulating circuit said correlated values at the sampling points which are the same in displacement from each of the typical points between the small areas in each of said the motion vector detecting areas, said control circuit comprising means for generating a read control pulse when said input image data corresponds to each of the sampling points in a start and in the horizontal scanning direction in each of the small ares is sent to said latch circuit, means for generating two write control pulses when said input image data corresponds to the typical point in each of the small areas in sent to said latch circuit, and means for inhibiting one of said two write control pulses from being supplied to said typical point data storing means when the timing of generating said write control pulse and the timing of generating said read control pulse coincide with each other.

18. In a motion vector detecting circuit, wherein a motion vector detecting area set in a video area is divided into a plurality of small areas, and a plurality of respective sampling points and one typical point are set in each of the small areas, for comparing input image data corresponding to each of the sampling points in each of the small areas in the present frame with input image data corresponding to a typical point selected in the corresponding small area in the preceding frame and detecting as a motion vector a position where correlation is the highest, motion vector detecting circuit comprising:

typical point data storing means for storing said input image data corresponding to a typical point selected in each of the small areas;

a latch circuit provided in the preceding stage of said typical point data storing means and for temporality holding said input image data corresponding to the typical point;

a control circuit for controlling writing and reading of said input image data to and from said typical point data storing means;

a correlated value operating circuit for determining correlated values at said respective sampling points on the basis of said input image data corresponding to each of the sampling points in each of the small areas in the present frame and said input image data corresponding to the typical point in the corresponding small area in the preceding frame which is stored in said typical point data storing means;

an accumulating circuit for accumulating said correlated values determined by said correlated value operating circuit at the sampling points which are the same in displacement from each of the typical points between the small areas in each of the motion vector detecting areas out of said correlated values which are determined by said correlated value operating circuit; and a motion vector generating circuit for generating a motion vector on the basis of values obtained by accumulating using said accumulating circuit said correlated values at the sampling points which are the same in displacement from each of the typical points between the small areas in each of said the motion vector detecting areas, said control circuit comprising means for generating a read control pulse when said input image data corresponds to the typical point in each of the small areas is sent to said latch circuit, the means for inhibiting one of said two write control pulses from being supplied to said typical point data storing means when the timing of generating said write control pulse and the timing of generating said read control pulse coincide with each other.

* * * * *